(12) United States Patent
Qurashi et al.

(10) Patent No.: US 11,427,919 B2
(45) Date of Patent: Aug. 30, 2022

(54) GALLIUM OXYNITRIDE-ZINC OXIDE PHOTOELECTRODE FOR SOLAR WATER SPLITTING

(71) Applicant: King Fahd University of Petroleum and Minerals, Dhahran (SA)

(72) Inventors: Ahsanulhaq Qurashi, Dhahran (SA); Ibrahim Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 95 days.

(21) Appl. No.: 16/131,236

(22) Filed: Sep. 14, 2018

(65) Prior Publication Data

US 2020/0087802 A1    Mar. 19, 2020

(51) Int. Cl.
| | | |
|---|---|---|
| *C25B 11/04* | (2021.01) | |
| *C25B 11/091* | (2021.01) | |
| *C01B 21/082* | (2006.01) | |
| *C25B 1/04* | (2021.01) | |
| *C25B 11/00* | (2021.01) | |

(52) U.S. Cl.
CPC ........ *C25B 11/091* (2021.01); *C01B 21/0821* (2013.01); *C25B 1/04* (2013.01); *C25B 11/00* (2013.01); *C01P 2002/50* (2013.01); *C01P 2002/72* (2013.01); *C01P 2002/82* (2013.01);
(Continued)

(58) Field of Classification Search
CPC ......... C25B 11/091; C25B 1/04; C25B 11/00; C25B 11/075; C25B 1/55; C25B 11/069; C25B 11/051; C01B 21/0821; C01P 2002/50; C01P 2002/72; C01P 2002/82; C01P 2002/85; C01P 2004/03; C01P 2004/16; C08G 61/124; C08G 16/0218; C08G 2261/5222; C08G 2261/91; C08G 2261/12; C08G 2261/312;
(Continued)

(56) References Cited

U.S. PATENT DOCUMENTS

| | | | |
|---|---|---|---|
| 2013/0001094 A1 | 1/2013 | Cable et al. | |
| 2015/0090604 A1* | 4/2015 | Artero | B01J 23/755 |
| | | | 502/1 |

(Continued)

FOREIGN PATENT DOCUMENTS

| | | |
|---|---|---|
| CN | 101245491 B | 6/2011 |
| CN | 107012474 A | 8/2017 |
| KR | 10-2011-0017049 | 2/2011 |

OTHER PUBLICATIONS

Iqbal et al. ("Sonochemical Assisted Solvothermal Synthesis of Gallium Oxynitride Nanosheets and their Solar-Driven Photoelectrochemical Water-Splitting Applications", Scientific Reports, 6:32319 (2016)) (Year: 2016).*

(Continued)

*Primary Examiner* — Xiuyu Tai
(74) *Attorney, Agent, or Firm* — Oblon, McClelland, Maier & Neustadt, L.L.P.

(57) ABSTRACT

A GaON/ZnO photoelectrode involving a nanoarchitectured photocatalytic material deposited onto a surface of a conducting substrate, and the nanoarchitectured photocatalytic material containing gallium oxynitride nanoparticles interspersed in zinc oxide nanoparticles, as well as methods of preparing the GaON/ZnO photoelectrode. A method of using the GaON/ZnO photoelectrode for solar water electrolysis is also provided.

20 Claims, 22 Drawing Sheets

(52) U.S. Cl.
CPC ...... *C01P 2002/85* (2013.01); *C01P 2004/03* (2013.01); *C01P 2004/16* (2013.01)

(58) Field of Classification Search
CPC ........ C08G 2261/3422; C08G 2261/42; C08G 2261/344
See application file for complete search history.

(56) References Cited

U.S. PATENT DOCUMENTS

2016/0136631 A1   5/2016  Gopinath et al.
2017/0314147 A1  11/2017  Imanaka et al.

OTHER PUBLICATIONS

Hingure Arachchilage Naveen DHARMAGUNAWARDHANE, "Synthesis of oxynitride materials for solar water splitting: investigations with ambient pressure and high pressure synthesis techniques", Stony Brook University, Jan. 2017, pp. 1-108.

Hidehisa Hagiwara, et al., "Effects of preparation condition on the photocatalytic activity of porphyrin-modified GaN:ZnO for water splitting", Surface and Coatings Technology, vol. 324, Sep. 15, 2017, pp. 601-606.

Babak Adeli Koudehi, et al., "Solar Hydrogen Generation Through Overall Water Splitting on Gallium-Zinc Oxynitride Visible-Light Activated Photocatalyst", The University of British Columbia, Jan. 2017, pp. 1-264.

\* cited by examiner

O Kα1

N Kα1_2

Ga Kα1

GALLIUM OXYNITRIDE-ZINC OXIDE PHOTOELECTRODE FOR SOLAR WATER SPLITTING

STATEMENT OF FUNDING ACKNOWLEDGEMENT

This project was prepared with support from the National Plan for Science, Technology, and Innovation (MAARIFAH) of King Abdulaziz City for Science and Technology through the Science and Technology Unit at King Fand University of Petroleum and Minerals (KFUPM), the Kingdom of Saudi Arabia, under award No. 13-NAN1600-04.

STATEMENT REGARDING PRIOR DISCLOSURE BY THE INVENTORS

Aspects of this technology are described in an article "Single-step strategy for the fabrication of GaON/ZnO nanoarchitectured photoanode their experimental and computational photoelectrochemical water splitting" published in Nano Energy, 2018, 44, 23-33, on Dec. 2, 2017, which is incorporated herein by reference in its entirety.

BACKGROUND OF THE INVENTION

Technical Field

The present disclosure relates to a GaON/ZnO photoelectrode and methods of its preparation. The present disclosure further relates to a method of using the GaON/ZnO photoelectrode as part of a photoelectrochemical cell for water splitting.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As a renewable energy substitute for fossil fuels, solar radiation may alleviate the worldwide energy constraint without posing an environmental threat. Photoelectrochemical (PEC) water splitting is considered as a solution to generate hydrogen gas using renewable energy sources including water and sunlight, which are both abundant. In principle, semiconductor photoelectrodes capture sunlight photons to generate photoexcitons, i.e. electrons ($e^-$) and holes ($h^+$) in their conduction (CB) and valence bands (VB), respectively. The photoexcitons having an adequate energy would initiate redox reactions and split water into $H_2$ and $O_2$ gases. Fujishima and Honda accomplished overall water splitting using a $TiO_2$ photocatalyst under ultraviolet radiations [A. Fujishima, K. Honda, Electrochemical photolysis of water at a semiconductor electrode, Nature 238 (1972) 37-38]. There has been intense research activity on metals, semiconductors, and organic conjugated systems in trying to shift the activation wavelength of the PEC process to the visible region [R. Xu, H. Li, W. Zhang, Z. Yang, G. Liu, Z. Xu, H. Shao, G. Qiao, The fabrication of $In_2O_3/In_2S_3/Ag$ nanocubes for efficient photoelectrochemical water splitting, Phys. Chem. Chem. Phys. 18 (2016) 2710-2717; V. Avasare, Z. Zhang, D. Avasare, I. Khan, A. Qurashi, Room-temperature synthesis of $TiO_2$ nanospheres and their solar driven photoelectrochemical hydrogen production, Int. J. Energy Res. 39 (2015) 1714-1719; and N. Iqbal, I. Khan, Z. H. Yamani, A. Qurashi, Sonochemical assisted solvothermal synthesis of gallium oxynitride nanosheets and their solar-driven photoelectrochemical water-splitting applications, Sci. Rep. 6 (2016) 32319, each incorporated herein by reference in their entirety]. However, the fabrication of an efficient and stable PEC water splitting system remains a fundamental issue relating to PEC technique. Additionally, certain factors such as limited light absorption, insufficient generation of photoexcitons ($e^-$ and $h^+$) and their separation, and limited water redox reactions limit the performance of PEC water splitting catalyst, and hence decrease the overall efficiency of the energy transfer process. In order to overcome these problems, many approaches such as tandem cell fabrication, hybrid/composite structure formations, nitrogen doping, as well as decorating the surface of photoelectrode with stable and efficient co-catalysts such as Ag and Au due to their enhanced water redox reaction kinetics were attempted [S. Esiner, G. W. P. van Pruissen, M. M. Wienk, R. A. J. Janssen, G. W. P. van Pruissen, M. M. Wienk ab, R. A. J. Janssen, G. W. P. van Pruissen, M. M. Wienk, R. A. J. Janssen, Optimized light-driven electrochemical water splitting with tandem polymer solar cells, J. Mater. Chem. A 4 (2016) 5107-5114; U. Veikko, X. Zhang, T. Peng, P. Cai, G. Cheng, The synthesis and characterization of dinuclear ruthenium sensitizers and their applications in photocatalytic hydrogen production, Spectrochim. Acta Part A Mol. Biomol. Spectrosc. 105 (2013) 539-544; C. Nguyen Van, T. H. Do, J.-W. Chen, W.-Y. Tzeng, K.-A. Tsai, H. Song, H.-J. Liu, Y.-C. Lin, Y.-C. Chen, C.-L. Wu, C.-W. Luo, W.-C. Chou, R. Huang, Y.-J. Hsu, Y.-H. Chu, $WO_3$ mesocrystal-assisted photoelectrochemical activity of $BiVO_4$, NPG Asia Mater. 9 (2017) e357; and T. Hisatomi, J. Kubota, K. Domen, Recent advances in semiconductors for photocatalytic and photoelectrochemical water splitting, Chem. Soc. Rev. 43 (2014) 7520-7535, each incorporated herein by reference in their entirety]. Even though some approaches have enhanced the efficiency of PEC water splitting, further research is necessary to make the production of hydrogen gas more economical. In general, a solar junction cell would be considered efficient if the photoelectrode is robust to photocorrosion and capable of splitting water without the assistance of a co-catalyst. Thus, high-performance multi-component photoactive materials are needed.

With n-type semi-conductor characteristics including an indirect band gap of 3.37 eV, ZnO is a cost-effective alternative to $TiO_2$. As revealed from a comparative study by Hernandez et al., ZnO showed improved photocurrent densities compared to $TiO_2$ [S. Hernandez, D. Hidalgo, A. Sacco, A. Chiodoni, A. Lamberti, V. Cauda, E. Tresso, G. Saracco, Comparison of photocatalytic and transport properties of $TiO_2$ and ZnO nanostructures for solar-driven water splitting, Phys. Chem. Chem. Phys. 17 (2015) 7775-7786, incorporated herein by reference in its entirety]. ZnO, which has a band edge straddling the water oxidation potential level, is a good photocatalyst for oxygen evolution reactions (OER). However, due to high recombination rate of its excitons, the quantum yield of ZnO is still insufficient [Z.-Q. Liu, P.-Y. Kuang, R.-B. Wei, N. Li, Y.-B. Chen, Y.-Z. Su, BiOBr nanoplate-wrapped ZnO nanorod arrays for high performance photoelectrocatalytic application, RSC Adv. 6 (2016) 16122-16130, incorporated herein by reference in its entirety], which makes the implementation of ZnO in its pristine form challenging. Therefore, substantial efforts have been devoted to improve the photo-efficiency of ZnO through doping [H.-J. Choi, S.-J. Choi, S. Choo, I.-D. Kim, H. Lee, Hierarchical ZnO nanowires-loaded Sb-doped $SnO_2$—ZnO micrograting pattern via direct imprinting-assisted hydrothermal growth and its selective detection of acetone molecules, Sci. Rep. 6 (2016) 18731, incorporated herein by reference in its entirety], or by making heterostructural composites [J. Lee, K. Yong, Combining the lotus leaf effect with artificial photosynthesis: regeneration of underwater superhydrophobicity of hierarchical ZnO/Si surfaces by solar water splitting, NPG Asia Mater. 7 (2015) e201; and I. Khan, A. A. M. Ibrahim, M. Sohail, A. Qurashi, Sonochemical assisted synthesis of RGO/ZnO nanowire arrays for photoelectrochemical water splitting, Ultrason. Sonochem. 37 (2017) 669-675, each incorporated herein by reference in their entirety] with additional materials having suitable bandgaps.

The photocatalytic properties of pristine semiconductors can be increased by loading appropriate noble metal co-catalysts and/or transition metal oxides. As an example, GaN:ZnO was tested for overall PEC water splitting, owing to its good visible light absorption and photocorrosion resistance characteristics [K. Maeda, T. Takata, M. Hara, N. Saito, Y. Inoue, H. Kobayashi, K. Domen, GaN:ZnO solid solution as a photocatalyst for visible-light-driven overall water splitting, J. Am. Chem. Soc. 127 (2005) 8286-8287, incorporated herein by reference in its entirety]. Loading 5 wt % $RuO_2$ to GaN:ZnO further enhanced the photocatalytic activity of the overall catalytic system. Suitable band edge alignments with the thermodynamic OER and hydrogen evolution reaction (HER) energy bands enable a better photocatalytic performance on overall PEC water splitting. Continued effort in synthetic modification has led to a PEC water splitting photocatalyst having a long lifetime, which is active under visible solar light with the aid of $Rh_{2-y}Cr_yO_3$ co-catalysts [T. Ohno, L. Bai, T. Hisatomi, K. Maeda, K. Domen, Photocatalytic water splitting using modified GaN:ZnO solid solution under visible light: long-time operation and regeneration of activity, J. Am. Chem. Soc. 134 (2012) 8254-8259, incorporated herein by reference in its entirety]. However, due to undesirable recombination between ($e^-$) and ($h^+$), a high efficiency is not yet achieved. The fabrication of ZnO:GaN material may be a useful approach to reduce the charge recombination and suppress the electron diffusion through the ZnO:GaN/electrolyte boundary. Furthermore, methods including nitridation and assembling these materials onto a conductive electrode such as ITO, FTO etc. would enable exterior electric field to improve the charge separation [S. Yu, B. Liu, Q. Wang, Y. Gao, Y. Shi, X. Feng, X. An, L. Liu, J. Zhang, Ionic liquid assisted chemical strategy to $TiO_2$ hollow nanocube assemblies with surface-fluorination and nitridation and high energy crystal facet exposure for enhanced photocatalysis, ACS Appl. Mater. Interfaces 6 (2014) 10283-10295, incorporated herein by reference in its entirety].

Gallium oxynitride (GaON) may be a suitable additive to ZnO. It is nitrogen- and oxygen-rich. With a proper amount of doped nitrogen, GaON showed improved optical properties [N. Iqbal, I. Khan, Z. H. Yamani, A. Qurashi, Sonochemical assisted solvothermal synthesis of gallium oxynitride nanosheets and their solar-driven photoelectrochemical water-splitting applications, Sci. Rep. 6 (2016) 32319; and C.-C. Hu, H. Teng, Gallium oxynitride photocatalysts synthesized from $Ga(OH)_3$ for water splitting under visible light irradiation, J. Phys. Chem. C 114 (2010) 20100-20106, each incorporated herein by reference in their entirety]. Lately, Delaunay and Domen et al. fabricated a ZnO—ZnGaON photoanode composite using a complicated and challenging chemical vapor deposition (CVD) method at a relatively high temperature, i.e. 600° C. A photocurrent efficiency of about 1.5 $mA/cm^2$ was achieved [M. Zhong, Y. Ma, P. Oleynikov, K. Domen, J.-J. Delaunay, A conductive ZnO—ZnGaON nanowire-array-on-a-film photoanode for stable and efficient sunlight water splitting, Energy Environ. Sci. 7 (2014) 1693, incorporated herein by reference in its entirety]. More recently, a simple solvothermal synthesis and photoelectrochemical water splitting properties of GaON nanosheets were reported [N. Iqbal, I. Khan, Z. H. Yamani, A. Qurashi, Sonochemical assisted solvothermal synthesis of gallium oxynitride nanosheets and their solar-driven photoelectrochemical water-splitting applications, Sci. Rep. 6 (2016) 32319, incorporated herein by reference in its entirety]. However, the photocurrent density of the GaON nanosheets was lower than pristine GaON.

In view of the forgoing, one objective of the present invention is to provide a GaON/ZnO photoelectrode based on a photocatalytic material having gallium oxynitride nanoparticles interspersed in zinc oxide nanoparticles, and a method for making thereof. The GaON/ZnO photoelectrode may be used in a photoelectrochemical cell for producing hydrogen and oxygen gases.

BRIEF SUMMARY OF THE INVENTION

According to a first aspect, the present disclosure relates to a GaON/ZnO photoelectrode, including a metal oxide conducting substrate, and a nanoarchitectured photocatalytic material deposited onto a surface of the metal oxide conducting substrate, wherein the nanoarchitectured photocatalytic material comprises zinc oxide nanoparticles, and gallium oxynitride nanoparticles interspersed in the zinc oxide nanoparticles.

In one embodiment, the zinc oxide nanoparticles are in the form of nanorods.

In one embodiment, the gallium oxynitride nanoparticles are in the form of nanosheets.

In one embodiment, the nanorods have an average diameter of 20-100 nm and an average length of 500-2,000 nm.

In one embodiment, the nanosheets have an average thickness of 5-50 nm and an average length of 200-1,500 nm.

In one embodiment, a weight ratio of the zinc oxide nanoparticles to the gallium oxynitride nanoparticles is in a range of 4:1 to 100:1.

In one embodiment, the metal oxide conducting substrate is fluorine doped tin oxide substrate.

In one embodiment, the GaON/ZnO photoelectrode has an ultraviolet visible absorption with an absorption edge of 410-520 nm.

In one embodiment, the GaON/ZnO photoelectrode has a band gap energy of 2.2-2.7 eV.

According to a second aspect, the present disclosure relates to a photoelectrochemical cell containing the GaON/ZnO photoelectrode of the first aspect, a counter electrode, and an electrolyte solution comprising water and an inorganic salt in contact with both the GaON/ZnO photoelectrode and the counter electrode.

In one embodiment, the electrolyte solution has an inorganic salt concentration of 0.05-1 M.

In one embodiment, the GaON/ZnO photoelectrode has a photo-current density in a range from 0.01-1.5 $mA/cm^2$ when the photoelectrochemical cell is subjected to a potential of 0.1 to 1.5 V under visible light irradiation.

In one embodiment, the photoelectrochemical cell further comprises a reference electrode.

According to a third aspect, the present disclosure relates to a method of splitting water into hydrogen gas and oxygen gas. The method involves the steps of subjecting the photoelectrochemical cell of the second aspect to a potential of 0.5 to 2.0 V, and concurrently irradiating the photoelectrochemical cell with visible light, thereby forming hydrogen gas and oxygen gas.

According to a fourth aspect, the present disclosure relates to a method of producing the GaON/ZnO photoelectrode of the first aspect. The method involves the steps of mixing zinc oxide nanoparticles and gallium oxynitride nanoparticles in a solvent to form a mixture, sonicating the mixture to form a dispersed mixture, depositing the dispersed mixture onto a surface of a metal oxide conducting substrate to form a deposited substrate, and heating the deposited substrate at a temperature of 70-150° C. for 0.5-4 hours.

In one embodiment, a weight ratio of the zinc oxide nanoparticles to the gallium oxynitride nanoparticles is in a range of 4:1 to 100:1.

In one embodiment, the solvent is water.

In one embodiment, the depositing is performed at a temperature of 50-120° C.

In one embodiment, the depositing is performed at a pressure of 100-300 KPa.

In one embodiment, the heating is followed by cooling to a temperature ranging from 5-40° C. thereby forming the GaON/ZnO photoelectrode.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
FIG. 1A shows an optimized unit cell of GaON.
Figure 1A:
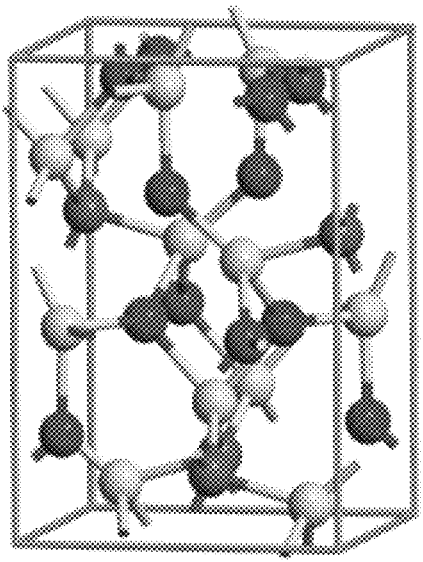

Embodiments of the present disclosure will now be described more fully hereinafter with reference to the accompanying drawings, in which some, but not all embodiments of the disclosure are shown.

The present disclosure may be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

The present disclosure further includes all isotopes of atoms occurring in the present compounds. Isotopes include those atoms having the same atomic number but different mass numbers. By way of general example, and without limitation, isotopes of hydrogen include deuterium and tritium, isotopes of oxygen include $^{16}O$, $^{17}O$ and $^{18}O$, isotopes of nitrogen include $^{14}N$, and $^{15}N$, stable isotopes of gallium include $^{69}Ga$, and $^{71}Ga$, and stable isotopes of zinc include $^{64}Zn$, $^{66}Zn$, $^{67}Zn$, $^{68}Zn$, and $^{70}Zn$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

According to a first aspect, the present disclosure relates to a GaON/ZnO photoelectrode, including a metal oxide conducting substrate, and a nanoarchitectured photocatalytic material deposited onto a surface of the metal oxide conducting substrate.

A particle is defined as a small object that behaves as a whole unit with respect to its transport and properties. An average diameter (e.g., average particle diameter) of the particle, as used herein, and unless otherwise specifically noted, refers to the average linear distance measured from one point on the particle through the center of the particle to a point directly across from it. For polygonal shapes, the term "diameter", as used herein, and unless otherwise specified, refers to the greatest possible distance measured from a vertex of a polygon through the center of the face to the vertex on the opposite side. For a circle, an oval, an ellipse, and a multilobe, "diameter" refers to the greatest possible distance measured from one point on the shape through the center of the shape to a point directly across from it.

Nanoparticles are particles between 1 and 100 nm in size. The exceptionally high surface area to volume ratio of nanoparticles may cause the nanoparticles to exhibit significantly different or even novel properties from those observed in individual atoms/molecules, fine particles and/or bulk materials. Nanoparticles may be classified according to their dimensions. Three-dimensional nanoparticles preferably have all dimensions of less than 100 nm, and generally encompass isodimensional nanoparticles. Examples of three dimensional nanoparticles include, but are not limited to nanoparticles, nanospheres, nanogranules and nanobeads. Two-dimensional nanoparticles have two dimensions of less than 100 nm, generally including diameter. Examples of two-dimensional nanoparticles include, but are not limited to, nanosheets, nanoplatelets, nanolaminas and nanoshells. One-dimensional nanoparticles have one dimension of less than 100 nm, generally thickness. Examples of one-dimensional nanoparticles include, but are not limited to, nanorods, nanotubes, nanofibers and nanowhiskers.

The nanoarchitectured photocatalytic material of the presently disclosed GaON/ZnO photoelectrode comprises zinc oxide in the form of particles of the same shape or different shapes, and of the same size or different sizes. In one or more embodiments, the zinc oxide particles are in the form of nanoparticles. The zinc oxide nanoparticles may be one-dimensional, two-dimensional, three-dimensional nanoparticles or mixtures thereof. Preferably, the zinc oxide nanoparticles are one-dimensional nanoparticles. In an alternative embodiment, the zinc oxide nanoparticles used in the present disclosure may have one or more dimensions greater than 100 nm. In preferred embodiments, the zinc oxide nanoparticles are in the form of nanorods (zinc oxide nanorods). Nanorods, also termed as nanowires, are a one-dimensional nanostructure with a standard aspect ratio (length divided by width or diameter) of about 3-5. Depending on factors such as material identities and preparation techniques, nanorods may have an aspect ratio that is greater than 5.

The cross-section of the zinc oxide nanorods may be of any desired shape, such as a circle, an oval, an ellipse, a multilobe, and a polygon. In a preferred embodiment, the cross-section of the zinc oxide nanorods is rectangular shaped. In another preferred embodiment, the cross-section of the zinc oxide nanorods is polygonal shaped. As defined herein, a diameter of a zinc oxide nanorod is measured at the point along the nanorod where the cross section is the widest. An average diameter of the zinc oxide nanorods refers to the average of diameters of each nanorod present in the nanoarchitectured photocatalytic material. In one or more embodiments, the zinc oxide nanorods have an average diameter of 20-200 nm, preferably 40-150 nm, more preferably 60-100 nm. However, in certain embodiments, the average diameter of the zinc oxide nanorods is less than 20 nm, or greater than 200 nm. In one or more embodiments, the zinc oxide nanorods have an average length of 500-2,000 nm, preferably 800-1,600 nm, more preferably 1000-1,200 nm. However, in certain embodiments, the average length of the zinc oxide nanorods is less than 500 nm, or greater than 2,000 nm. In one embodiment, the zinc oxide nanorods have an aspect ratio of 3-200, 5-100, 10-50, or 20-40. The cross-section of the zinc oxide nanorods may be constant over the length of the nanorods or may vary over the length.

In one embodiment, the zinc oxide nanorods are uniform throughout the entire length of the nanorods and are of a cylindrical shape. In another embodiment, the zinc oxide nanorods are conical-shaped or elongated oval-shaped (cigar-shaped). In a preferred embodiment, the zinc oxide nanorods have rectangular or polygonal shaped cross-sections with diameters that taper along the length of the nanorod to a rounded tip (see FIG. 4D).

The photocatalytic material of the presently disclosed GaON/ZnO photoelectrode comprises gallium oxynitride in the form of particles of the same shape or different shapes, and of the same size or different sizes. In one or more embodiments, the gallium oxynitride particles are in the form of nanoparticles. The gallium oxynitride nanoparticles preferably are two-dimensional nanoparticles but may be one-dimensional, two-dimensional, three-dimensional or mixtures thereof. In an alternative embodiment, the gallium oxynitride nanoparticles used in the present disclosure may have one or more dimensions greater than 100 nm. In preferred embodiments, the gallium oxynitride nanoparticles are in the form of nanosheets (gallium oxynitride nanosheets). Nanosheets, also known as ultrathin film, have a two-dimensional nanostructure with a large surface area to thickness ratio.

The gallium oxynitride nanosheets may be of any desired shape, such as a triangle, a rectangle, a pentagon, a hexagon, or an irregular polygon. In a preferred embodiment, the gallium oxynitride nanosheets have irregular or scalloped edges. In one or more embodiments, the gallium oxynitride nanosheets have an average thickness of 5-80 nm, preferably 10-50 nm, more preferably 20-40 nm. However, in certain embodiments, the average thickness of the gallium oxynitride nanosheets is less than 5 nm, or greater than 80 nm. In one or more embodiments, the gallium oxynitride nanosheets have an average length of 200-1,500 nm, preferably 400-1,200 nm, more preferably 600-1,000 nm. In certain embodiments, the average length of the gallium oxynitride nanosheets is less than 200 nm, or greater than 1,500 nm. The gallium oxynitride nanosheets may be agglomerated or non-agglomerated (i.e., the gallium oxynitride nanosheets are well separated from one another and do not form clusters). In one embodiment, the gallium oxynitride nanosheets are agglomerated and the agglomerates have an average diameter in a range of 1-50 μm, 2-25 μm, or 5-10 μm. In a preferred embodiment, the gallium oxynitride nanosheet agglomerate has a petal-like arrangement (see FIG. 4B).

In one or more embodiments, the gallium oxynitride nanoparticles (e.g. nanosheets) are interspersed in the zinc oxide nanoparticles (e.g. nanorods). The gallium oxynitride nanoparticles may interact with the zinc oxide nanoparticles via van der Waals forces and/or electrostatic forces. In one or more embodiments, the gallium oxynitride nanoparticles are randomly located in the zinc oxide nanoparticles, i.e. distances between a gallium oxynitride nanoparticle and its neighboring gallium oxynitride nanoparticles are different. Alternatively, the gallium oxynitride nanoparticles are evenly arranged in the zinc oxide nanoparticles, i.e. a distance between a gallium oxynitride nanoparticle and all its neighbors is the same or substantially the same. The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a gallium oxynitride nanoparticle to a center of a neighboring gallium oxynitride nanoparticle and may be in a range of 1 nm to 1 μm, 10-800 nm, 50-600 nm, 100-400 nm, or 200-300 nm. Energy-dispersive X-ray spectroscopy, X-ray microanalysis, elemental mapping, transmission electron microscopy, scanning electron microscopy (see FIGS. 4C-D in Example 3), and scanning transmission electron microscopy may be useful techniques for observing the arrangement of nanoparticles.

In one or more embodiments, a weight ratio of the zinc oxide nanoparticles to the gallium oxynitride nanoparticles is in a range of 2:1 to 100:1, preferably 3:1 to 40:1, preferably 4:1 to 36:1, preferably 6:1 to 34:1, preferably 8:1 to 32:1, preferably 10:1 to 30:1, preferably 12:1 to 28:1, preferably 14:1 to 26:1, preferably 16:1 to 24:1, preferably 18:1 to 22:1, or about 19:1. In certain embodiments, however, the weight ratio of the zinc oxide nanoparticles to the gallium oxynitride nanoparticles is less than 2:1 or greater than 100:1.

In one or more embodiments, the aforementioned nanoarchitectured photocatalytic material comprising the zinc oxide and gallium oxynitride nanoparticles is deposited onto a surface of a substrate. The nanoarchitectured photocatalytic material may be adsorbed on the surface (e.g. by van der Waals and/or electrostatic forces) of the substrate. Exemplary substrates include fluorine doped tin oxide (FTO) film, indium tin oxide (ITO) film, ITO coated polyethylene terephthalate (PET) film, a gold film, gold coated glass, aluminum oxide, titanium oxide, nickel oxide, tungsten oxide, strontium titanate, quartz, and silicon wafer. In a preferred embodiment, the substrate is a metal oxide conducting substrate. In an even more preferred embodiment, the metal oxide conducting substrate used is fluorine doped tin oxide (FTO). The substrate may be of any desirable shape, such as, a circle, a triangle, a rectangle, a pentagon, a hexagon, an irregular polygon, a circle, an oval, an ellipse, or a multilobe. Preferably the substrate is rectangular in shape with a length and width of 0.5-5 cm, 1-4 cm, or 2-3 cm, respectively.

In a preferred embodiment, 70-100%, more preferably 80-99%, even more preferably 85-97% of the surface of the metal oxide conducting substrate is covered with the nanoarchitectured photocatalytic material, though in some embodiments, less than 70% of the surface of the metal oxide conducting substrate is covered with the nanoarchitectured photocatalytic material.

As used herein, UV-vis spectroscopy or UV-vis spectrophotometry refers to absorption spectroscopy or reflectance spectroscopy in the ultraviolet-visible spectral region. This means it uses light in the visible and adjacent (near-UV and near-infrared) ranges. The absorption or reflectance in the visible range directly affects the perceived color of the chemicals involved. In this region of the electromagnetic spectrum, molecules undergo electronic transitions. Molecules containing π-electrons or non-bonding electrons (π-electrons) can absorb the energy in the form of ultraviolet or visible light to excite these electrons to higher anti-bonding molecular orbitals. The more easily excited the electrons (i.e. the lower the energy gap between the HOMO and the LUMO), the longer the wavelength of light it can absorb. This technique is complementary to fluorescence spectroscopy, in that fluorescence deals with transitions from the excited state to the ground state, while absorption measures transitions from the ground state to the excited state. In one or more embodiments, the GaON/ZnO photoelectrode described herein has an ultraviolet visible absorption with an absorption edge in a range of 410-520 nm, preferably 420-500 nm, preferably 430-490 nm, preferably 440-480 nm, preferably 450-470 nm, or about 466 nm. In some embodiments, the GaON/ZnO photoelectrode has an absorption edge at a longer wavelength relative to a ZnO deposited photoelectrode by at least 30 nm, 40 nm, 50 nm, 52 nm, 54 nm, 56 nm, or at least 58 nm.

As used herein, band gap energy ($E_g$), band gap, and/or energy gap refers to an energy range in a solid where no electron states can exist. In graphs of the electronic band structure of solids, the band gap generally refers to the energy difference (in electron volts) between the top of the valence band and the bottom of the conduction band in insulators and/or semiconductors. It is generally the energy required to promote a valence electron bound to an atom to become a conduction electron, which is free to move within the crystal lattice and serve as a charge carrier to conduct electric current. Optoelectronic materials such as conjugated polymers are generally classified according to their band gap, which is closely related to the HOMO/LUMO gap in chemistry. Band gap energies for the GaON/ZnO photoelectrode described herein may be obtained using optical spectroscopies, e.g. UV-vis spectroscopy and/or electrochemical measurements, e.g. cyclic voltammetry (CV) and differential pulse voltammetry (DPV). In one or more embodiments, the GaON/ZnO photoelectrode of the present disclosure in any of its embodiments has a band gap energy of 2.1-3.2 eV, 2.2-3.0 eV, 2.3-2.9 eV, 2.4-2.8 eV, 2.5-2.7 eV, or about 2.58 eV. However, in some embodiments, the band gap energy may be less than 2.1 eV or greater than 3.2 eV.

According to another aspect, the present disclosure relates to a method of producing the GaON/ZnO photoelectrode of the first aspect. The method involves the steps of mixing zinc oxide nanoparticles and gallium oxynitride nanoparticles in a solvent to form a mixture. The mixture may comprise zinc oxide nanorods at a concentration of 0.1-10 g/mL, 0.2-5 g/mL, 0.3-4 g/mL, 0.4-3 g/mL, 0.5-2 g/mL, or 0.6-1 g/mL. In certain embodiments, 1 wt %, 3 wt %, or 5 wt % of GaON is present in the ZnO nanorods mixture. The zinc oxide nanoparticles used herein may have sizes, dimensions and properties as those previously described in the first aspect. In one or more embodiments, the zinc oxide nanoparticles used herein are in the form of nanorods have an average diameter of 20-200 nm, preferably 40-150 nm, more preferably 60-100 nm, and an average length of 500-2,000 nm, preferably 800-1,600 nm, more preferably 1000-1,200 nm.

The mixture may comprise gallium oxynitride nanoparticles at a concentration of 1-5,000 mg/mL, 10-4,000 mg/mL, 25-3,000 mg/mL, 50-2,000 mg/mL, 100-1,000 mg/mL, 200-800 mg/mL, or 400-600 mg/mL. In certain embodiments, 1 wt %, 3 wt % or 5 wt % of GaON is present in ZnO nanorods mixture, remaining 99 wt %, 97 wt %, or 95 wt % is ZnO nanorods. In a preferred embodiment, a weight ratio of the zinc oxide nanoparticles to the gallium oxynitride nanoparticles is in a range of 2:1 to 100:1, preferably 3:1 to 40:1, 4:1 to 36:1, preferably 6:1 to 34:1, preferably 8:1 to 32:1, preferably 10:1 to 30:1, preferably 12:1 to 28:1, preferably 14:1 to 26:1, preferably 16:1 to 24:1, preferably 18:1 to 22:1, or about 19:1. The mixture may be agitated by an agitator, a vortexer, a rotary shaker, a magnetic stirrer, a centrifugal mixer, or an overhead stirrer. In another embodiment, the mixture is left to stand (i.e. not agitated).

The gallium oxynitride nanoparticles used herein may have sizes, dimensions and properties as those previously described in the first aspect. In one or more embodiments, the gallium oxynitride nanoparticles used herein are in the form of nanosheets having an average thickness of 5-80 nm, preferably 10-50 nm, more preferably 20-40 nm, and an average length of 200-1,500 nm, preferably 400-1,200 nm, more preferably 600-1,000 nm. In one embodiment, the gallium oxynitride nanosheets may be prepared using a sonochemical assisted solvothermal synthesis. The method involves mixing a gallium metal, an amino chelating agent (e.g. ethylenediamine), with water to form a GaON reaction mixture. In a preferred embodiment, the GaON reaction mixture may be formed by sonication using a sonication bath or a sonication probe for 0.1-4 hours, 0.5-2 hours, or about 1 hour. The water may be mixed with the gallium metal and the amino chelating agent at the water addition rate of 1-20 mL/min, 2-10 mL/min, or about 5 mL/min. The GaON reaction mixture may then be heated at a temperature of 120-250° C. in an autoclave, a furnace, or an oven for 2-36 hours, 3-24 hours, or 6-12 hours to form a GaON reaction precipitate. Collecting, washing, and drying the GaON reaction precipitate to form the gallium oxynitride nanosheets. The GaON reaction precipitate may be collected via centrifuge at 1000-5000 rpm, 2000-4000 rpm, or 2500-3500 rpm. The GaON reaction precipitate may be washed using a solvent such as acetone, ethanol, or both. The GaON reaction precipitate may then dried at a temperature of 75-150° C., 85-125° C., 95-110° C., or about 100° C. for 0.5-6 hours, 1-4 hours, or about 2 hours in an oven or furnace. Preferably, the GaON reaction precipitate may be annealed at a temperature of 300-700° C., 400-600° C., or about 500° C. for 2-8 hours, 3-6 hours, or about 4 hours thereby forming the gallium oxynitride nanosheets.

A specific embodiment of the preparation of the gallium oxynitride nanosheets includes but is not limited to the following:

For synthesis, few grams of Gallium metal are mixed with ethylenediamine and placed in an ultrasonic bath for an hour at 75° C. During the ultrasonification, deionized water is added in 5 ml portions after every 5 min. time span. The appearance of black suspension shows the formation of Ga-ethylenediamine complex. After complete dissolution of gallium metal in ethylenediamine water solution, the reaction mixture is shifted into a stainless steel autoclave containing a Teflon vessel. The solvothermal reaction is carried out for 3, 6, 12 and 24 hours at 180° C. respectively. Afterwards the reaction mixture containing precipitates of Galliumoxynitride (GaON) in each case is centrifuged at 4000 RPM for 5 mins, washed with ethanol and acetone respectively before drying in a vacuum oven at 100° C. for two hours. Furthermore, the as prepared GaON nanosheets at 180° C. for 24 hours is further annealed at 500° C. for 4 hours owing to its best morphology achieved for comparative PEC studies.

In an alternative embodiment, the mixture used for producing the GaON/ZnO photoelectrode may be formed by a one-pot procedure by adding the zinc oxide nanorods directly to the GaON reaction precipitate generated in the aforementioned method for the preparation of the gallium oxynitride nanosheets, without further collecting, washing, heating, or annealing the GaON reaction precipitate.

In a preferred embodiment, the solvent is water. The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deinonized distilled, or reverse osmosis water and at 25° C. has a conductivity at less than 10 $\mu S \cdot cm^{-1}$, preferably less than 1 $\mu S \cdot cm^{-1}$, a resistivity greater than 0.1 $M\Omega \cdot cm$, preferably greater than 1 $M\Omega \cdot cm$, more preferably greater than 10 $M\Omega \cdot cm$, a total solid concentration less than 5 mg/kg, preferably less than 1 mg/kg, and a total organic carbon concentration less than 1000 μg/L, preferably less than 200 μg/L, more preferably less than 50 μg/L. In an alternative embodiment, other solvents such as methanol, ethanol, i-propanol, and n-butanol may be used in addition to, or in lieu of the water. The mixture may be sonicated for 0.1-4 hours, preferably 0.5-3 hours, more preferably 1-2 hours, using a sonication bath or a sonication probe to form a dispersed mixture. Alternatively, the mixture may not be sonicated but instead mixed, stirred, shaken, blended, and/or agitated for an equivalent amount time. In an alternative embodiment, the mixture may only be mixed to form a homogeneously dispersed mixture, and then left to stand for the previously indicated amount of time.

In a preferred embodiment, a deposited substrate may be formed by vertically suspending a metal oxide conducting substrate (e.g. FTO) inside the dispersed mixture for 2-12 hours, 4-10 hours, 5-8 hours, or about 6 hours at a pressure of 100-300 kPa, 125-275 kPa, 150-250 kPa, 175-225 kPa, or 190-200 kPa. The depositing may be performed within a furnace, an oven, or an autoclave. Preferably the depositing process starts at room temperature or 20-50° C., and then the temperature is increased to a target temperature of 50-120° C., 60-100° C., 70-90° C., or about 80° C. at a rate of 2-15° C./min, preferably 4-10° C./min, or about 5° C./min. The depositing process may continue at the target temperature for 0.5-12 hours, 1-10 hours, 2-8 hours, 4-7 hours, or about 6 hours. In a preferred embodiment, the suspending of the metal oxide conducting substrate (e.g. FTO) inside the dispersed mixture may not involve any forms of agitation (e.g. the substrate is left to stand in the dispersed mixture through the depositing process). Alternatively, the depositing may involve shaking, stirring, sonicating, and/or bubbling the dispersed mixture during the depositing process. In an alternative embodiment, the dispersed mixture may be deposited onto a surface of the metal oxide conducting substrate by other application procedures including, but not limited to, drop-casting, spin-coating, spraying, and spreading methods.

The deposited substrate may be left at room temperature and washed with a solvent such as water and/or ethanol. The deposited substrate may then be heated at a temperature of 70-150° C., 80-120° C., 90-110° C., or about 100° C. for 0.5-12 hours, 1-6 hours, or 2-4 hours. In one or more embodiments, the heating is followed by cooling to a temperature ranging from 5-40° C., 10-30° C., 15-25° C., or room temperature thereby forming the GaON/ZnO photoelectrode.

According to another aspect, the present disclosure relates to a photoelectrochemical cell containing the GaON/ZnO photoelectrode of the first aspect in any of its embodiment, a counter electrode, and an electrolyte solution comprising water and an inorganic salt in contact with both the GaON/ZnO photoelectrode and the counter electrode. As used herein, the GaON/ZnO photoelectrode may be considered as a working electrode in the photoelectrochemical cell.

In one embodiment, the photoelectrochemical cell is a vessel having an internal cavity for holding the electrolyte solution. The vessel may be cylindrical, cuboid, frustoconical, spherical, or some other shape. The vessel walls may comprise a material including, but not limited to, glass, quartz, polypropylene, polyvinyl chloride, polyethylene, and/or polytetrafluoroethylene. In a preferred embodiment, a vessel with a transparent window is used. For example, the window may comprise glass or quartz, though in one embodiment, a polymeric material transparent to visible light and chemically stable with the reaction mixture may be used. As defined herein, "transparent" refers to an optical quality of a compound wherein a certain wavelength or range of wavelengths of light may traverse through a portion of the compound with a small loss of light intensity. Here, the "transparent window" may causes a loss of less than 10%, preferably less than 5%, more preferably less than 2% of the intensity of a certain wavelength or range of wavelengths of light. In one embodiment, the vessel wall and window may comprise the same material, for example, a vessel may comprise quartz walls, which may also function as transparent windows. The internal cavity may have a volume of 2-100 mL, preferably 2.5-50 mL, more preferably 3-20 mL. In another embodiment, the internal cavity may have a volume of 100 mL-50 L, preferably 1-20 L, more preferably 2-10 L. In another embodiment, for instance, for pilot plant testing, the internal cavity may have a volume of 50-10,000 L, preferably 70-1,000 L, more preferably 80-2,000 L. In another embodiment, the internal cavity may have a volume larger than 2,000 L. In one embodiment, one or more photoelectrochemical cells may be connected to each other in parallel and/or in series. In another embodiment, the electrolyte solution may be in contact with more than one working electrode and/or more than one counter electrode.

In one embodiment, the counter electrode comprises platinum, gold, silver, or carbon. In a preferred embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures. In at least one embodiment, where the counter electrode comprises platinum, the counter electrode is in the form of a wire. In some embodiments, the counter electrode may comprise some other electrically-conductive material such as gold, platinum-iridium alloy, iridium, titanium, titanium alloy, stainless steel, and cobalt alloy. As defined herein, an "electrically-conductive material" is a substance with an electrical resistivity of at most $10^{-6}$ Ω·m, preferably at most $10^{-7}$ Ω·m, more preferably at most $10^{-8}$ Ω·m at a temperature of 20-25° C. In a preferred embodiment, the counter electrode has at least one outer surface comprising an essentially inert, electrically conducting material, such as platinum, gold, silver, or carbon. In another preferred embodiment, the counter electrode may comprise solid platinum, gold, or carbon. The material of the counter electrode should be sufficiently inert to withstand the chemical conditions in the electrolyte solution without substantially degrading during a photoelectrochemical reaction.

In one embodiment, the electrolyte solution has an inorganic salt concentration of 0.05-1 M, preferably 0.1-0.8 M, preferably 0.2-0.7 M, preferably 0.4-0.6 M, or about 0.5 M, though in some embodiments, the inorganic salt may be present at a concentration less than 0.05 M or greater than 1 M. The inorganic salt may be $Na_2SO_4$, $K_2SO_4$, $ZnSO_4$, LiCl, NaCl, KCl, $NaClO_4$, $KNO_3$, $NaNO_3$, $NH_4Cl$, $NH_4NO_3$, $LiPF_6$, $MgCl_2$, or some other inorganic salt. Preferably the inorganic salt is $Na_2SO_4$. In an alternative embodiment, an inorganic acid such as HCl, $HClO_4$, $HNO_3$, or $H_2SO_4$ may be used in addition to, or in lieu of the inorganic salt. In another alternative embodiment, an inorganic base such as LiOH, NaOH, KOH, or $NH_3$ may be may be used in addition to, or in lieu of the inorganic salt. In one or more embodiments, the electrolyte solution has a pH in a range of 5-9, preferably 6-8, more preferably a pH at about 7. In an alternative embodiment, the electrolyte solution has a pH less than 5 or greater than 9.

In one or more embodiments, the GaON/ZnO photoelectrode has a photo-current density in a range of 0.01-2 mA/cm$^2$, preferably 0.1-1.8 mA/cm$^2$, preferably 0.2-1.6 mA/cm$^2$, preferably 0.4-1.4 mA/cm$^2$, preferably 0.6-1.2 mA/cm$^2$, preferably 0.8-1 mA/cm$^2$ when the photoelectrochemical cell is subjected to a potential of 0.1 to 1.5 V, preferably 0.5 to 1.4 V, more preferably 0.8 to 1.3 V, or about 1.23 V under visible light irradiation.

In one embodiment, the GaON/ZnO photoelectrode has a photo-current density greater than 1 mA/cm$^2$ when the photoelectrochemical cell is subjected to a potential greater than 0.9 V under visible light irradiation. In one or more embodiments, the GaON/ZnO photoelectrode has a photo-current density in a range of 1-2 mA/cm$^2$, 1.1-1.8 mA/cm$^2$, 1.2-1.7 mA/cm$^2$, 1.3-1.6 mA/cm$^2$, or 1.4-1.5 mA/cm$^2$, when the photoelectrochemical cell is subjected to a potential of 0.9 to 2 V, 1.0 to 1.8 V, 1.2 to 1.5 V, or 1.3 to 1.4 V under visible light irradiation. In some embodiments, the photoelectrode has a photo-current density less than 0.2 mA/cm$^2$ when the photoelectrochemical cell is subjected to a potential less than 0.5 V under visible light irradiation. In an alternative embodiment, the photoelectrode has a photo-current density of 0.01-0.2 mA/cm$^2$, 0.02-0.15 mA/cm$^2$, 0.04-0.1 mA/cm$^2$, or 0.06-0.08 mA/cm$^2$ when the photoelectrochemical cell is subjected to a potential of 0.1 to 1.5 V, preferably 0.5 to 1.4 V, more preferably 0.8 to 1.3 V, or about 1.23 V under dark (without irradiation). In some embodiments, the photo-current density of the GaON/ZnO photoelectrode under dark is at least 25% less, at least 40% less, at least 50% less, at least 60% less, at least 70% less, at least 80% less, at least 90% less, or at least 95% less than that of the GaON/ZnO photoelectrode under visible light irradiation.

In certain embodiments, visible light irradiation may be performed by a light source internal or external to the photoelectrochemical cell and may provide the photon energy necessary to activate the photocatalytic material of the photoelectrochemical cell in any of its embodiments. The light source may be any known light source including, but not limited to, natural solar sunlight, simulated solar light, UV light, laser light, incandescent light, and the like. Exemplary light sources include, but are not limited to, a xenon lamp such as a xenon arc lamp and a xenon flash lamp, a mercurial lamp, a metal halide lamp, an LED lamp, a solar simulator, and a halogen lamp. In certain embodiments, two or more light sources may be used. In a preferred embodiment, a simulated solar light may be used as the light source. In another preferred embodiment, natural sunlight may be used as the light source. The light may be visible light having a wavelength of 400-800 nm, preferably 420-700 nm, more preferably 450-600 nm. The light source may comprise one or more wavelengths within the range of 400-800 nm. Preferably a light source is used which emits a broad wavelength range of light and which comprises a portion or the entire visible light spectrum. A light source may additionally emit light of wavelengths below 400 nm and/or above 800 nm. In one embodiment, a filter may be used to prevent UV light from entering the reaction mixture, for example, a filter that blocks light with wavelengths less than 420 nm may be used with a simulated solar light, xenon, or a mercury gas discharge lamp. Alternatively, a light source may be used which only emits light within the visible spectrum. In an alternative embodiment, the GaON/ZnO photoelectrode may be irradiated with UV light, with or without visible light. The light source may emit a total power of 50-2000 W, preferably 100-1500 W, more preferably 500-1000 W, and may be positioned 2-30 cm, preferably 5-20 cm, more preferably 8-15 cm from the closest surface of the photoelectrode. In a preferred embodiment, the light source has an intensity of 500-4000 W/m$^2$, preferably 700-2000 W/m$^2$, more preferably 900-1500 W/m$^2$, or about 1000 W/m$^2$ (100 mW/cm$^2$, 1 SUN power).

In one embodiment, the photoelectrochemical cell further comprises a reference electrode in contact with the electrolyte solution. A reference electrode is an electrode which has a stable and well-defined electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a saturated calomel electrode (SCE), a standard hydrogen electrode (SHE), a normal hydrogen electrode (NHE), a reversible hydrogen electrode (RHE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a saturated calomel electrode (SCE). However, in certain embodiments, the photoelectrochemical cell does not comprise a reference electrode.

In one or more embodiments, the photo-current density of the GaON/ZnO photoelectrode decreases by less than 15%, preferably less than 12%, preferably less than 10%, preferably less than 8%, preferably less than 6%, preferably less than 5%, preferably less than 4%, preferably less than 3%, preferably less than 2%, preferably less than 1% after subjecting the photoelectrochemical cell to a potential of 0.1 to 1.5 V, 0.25 to 1.25 V, 0.5 to 1 V, or 0.6-0.8 V under visible light irradiation for about 50-2,000 minutes, about 100-1,000 minutes, about 200-800 minutes, or about 400-600 minutes relative to that measured immediately after the subjecting commences.

According to another aspect, the present disclosure relates to a method of splitting water into hydrogen gas and oxygen gas. The method involves the steps of subjecting the photoelectrochemical cell of the second aspect to a potential of 0.5 to 2.0 V, preferably 0.6-1.8 V, preferably 0.7-1.6 V, preferably 0.8-1.4 V, preferably 0.9-1.3 V, preferably 1-1.2 V, and concurrently irradiating the photoelectrochemical cell with visible light, thereby forming hydrogen gas and oxygen gas. In some embodiments, the photoelectrochemical cell is subjected to a potential less than 0.5 V or greater than 2.0 V.

Photoelectrochemical water splitting dissociates water into its constituent parts, hydrogen ($H_2$) and oxygen ($O_2$), by applying a potential to a photoelectrochemical cell under either artificial or natural light. The process generally involve a photoelectrocatalyst absorbing a photon with sufficient energy (above 1.23 eV, X. <1000 nm), subsequently permitting photoexcited electrons and holes to separate and migrate to the surface of the photoelectrocatalyst material, reducing adsorbed species (i.e. water). Two types of photochemical systems operate via photocatalysis. One uses semiconductor surfaces as catalysts. In these devices the semiconductor surface absorbs solar energy and acts as an electrode for water splitting. The other methodology uses in-solution metal complexes as catalysts.

In one embodiment, the visible light may have a wavelength of 400-800 nm, preferably 420-700 nm, more preferably 450-600 nm. Irradiating the photoelectrochemical cell with visible light during water splitting may be performed by the aforementioned light source internal or external to the photoelectrochemical cell. The light source may comprise one or more wavelengths within the range of 400-800 nm. The light source may additionally emit light of wavelengths below 400 nm and/or above 800 nm. For example, a simulated solar light may be used as the light source. For another example, natural sunlight may be used as the light source. The light source may emit a total power of 50-2000 W, preferably 100-1500 W, more preferably 500-1000 W.

In one embodiment, the electrolyte solution of the photoelectrochemical cell during water splitting has a pH in a range of 4-10, preferably 5-9, preferably 6-8, more preferably a pH at about 7. In an alternative embodiment, the electrolyte solution has a pH less than 4 or greater than 10 during water splitting. In one embodiment, the aforementioned method of splitting water into hydrogen gas and oxygen gas involves subjecting the photoelectrochemical cell to a potential of 0.1-2.5 V, preferably 0.25-2.0 V, preferably 0.4-1.5 V, preferably 0.6-1.25 V, preferably 0.8-1.0 V, and concurrently irradiating the photoelectrochemical cell with visible light for 0.1-24 hours, 0.5-18 hours, 1-12 hours, 2-11 hours, 3-10 hours, 4-9 hours, 5-8 hours, or 6-7 hours.

Preferably, the counter electrode (e.g. the platinum wire) functions as the photocathode by receiving a negative potential to reduce water into $H_2$ gas and $OH^-$, while the GaON/ZnO photoelectrode functions as the photoanode by receiving a positive potential to oxidize $OH^-$ into $O_2$ gas and $H_2O$.

In one embodiment, the method further comprises a step of separately collecting H$_2$-enriched gas and O$_2$-enriched gas. In one embodiment, the space above each electrode may be confined to a vessel in order to receive or store the produced gases from one or both electrodes. The collected gas may be further processed, filtered, or compressed. Preferably the H$_2$-enriched gas is collected above the photocathode, and the O$_2$-enriched gas is collected above the photoanode. In one embodiment, the H$_2$-enriched gas and the O$_2$-enriched gas are not 100 vol % H$_2$ and 100 vol % O$_2$, respectively. For example, the enriched gas may also comprise N$_2$ from air, and water vapor and other dissolved gases from the electrolyte solution. The H$_2$-enriched gas may also comprise O$_2$ from air. The H$_2$-enriched gas may comprise greater than 20 vol % H$_2$, preferably greater than 40 vol % H$_2$, more preferably greater than 60 vol % H$_2$, even more preferably greater than 80 vol % H$_2$, relative to a total volume of the receptacle collecting the produced H$_2$ gas. The O$_2$-enriched gas may comprise greater than 20 vol % O$_2$, preferably greater than 40 vol % O$_2$, more preferably greater than 60 vol % O$_2$, even more preferably greater than 80 vol % O$_2$, relative to a total volume of the receptacle collecting the produced O$_2$ gas. In some embodiments, the produced gases may be bubbled into a vessel comprising water or some other liquid, and a higher concentration of H$_2$ or O$_2$ may be collected. In one embodiment, produced O$_2$ and H$_2$, or H$_2$-enriched gas and O$_2$-enriched gas may be collected in the same vessel.

The examples below are intended to further illustrate protocols for preparing, characterizing the GaON/ZnO photoelectrode, photoelectrochemical cell, and uses thereof, and are not intended to limit the scope of the claims.

EXAMPLE 1

Materials and Methods

Figure 2:
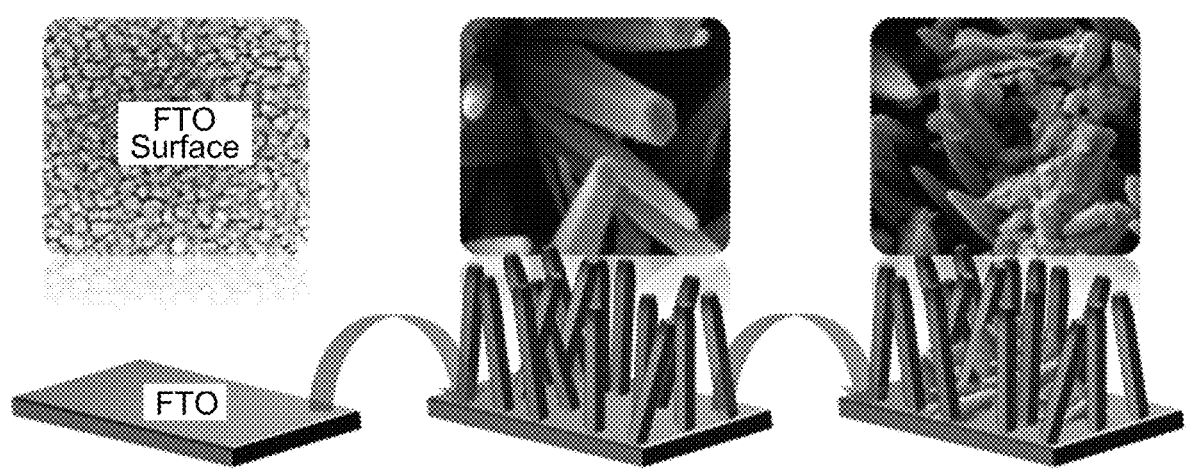
FIG. 2 is a schematic demonstration for the formation of GaON/ZnO nanoarchitecture.

The raw materials i.e. GaON nanosheets and ZnO nanorods (NRs) were prepared via established synthetic routes [N. Iqbal, I. Khan, Z. H. Yamani, A. Qurashi, Sonochemical assisted solvothermal synthesis of gallium oxynitride nanosheets and their solar-driven photoelectrochemical water-splitting applications, Sci. Rep. 6 (2016) 32319; and Q. Ahsanulhaq, J. H. Kim, Y. B. Hahn, Controlled selective growth of ZnO nanorod arrays and their field emission properties, Nanotechnology, vol. 18 (48), p. 485307, each incorporated herein by reference in their entirety]. One pot GaON/ZnO nanoarchitecture synthesis was achieved by mixing desirable concentrations of GaON nanosheets and ZnO NRs by weight (5:95) in a beaker containing 50 mL DI water through regular sonication for 1 hr. The uniform mixture was then transferred to a Teflon vessel with vertically suspended, freshly washed 2×2 cm$^2$ FTO glass (purchased from Sigma Aldrich). The purpose of suspending FTO in the reaction mixture was to deposit the as-synthesized GaON/ZnO nanoarchitecture directly over uncovered conducting surface of FTO to develop a homogenous film, which might possibly boost the device performance. The Teflon was sealed in the autoclave and kept at 80° C. for 6 hrs in a laboratory oven. The temperature was ramped at a ramping rate of 5° C./min to avoid vigorous heating and to achieve uniform reaction rate. A uniform firm, thin film of GaON/ZnO nanoarchitecture was deposited on the FTO glass within the autoclave at an elevated pressure (FIG. 2). The autoclave was replaced from the oven and was cooled spontaneously. The GaON/ZnO deposited FTO electrode was removed from autoclave, washed gently with DI water and kept at 100° C. for further drying for 2 hrs. For comparison purpose, ZnO/FTO and GaON/FTO photoelectrodes were also prepared by a similar approach.

The crystallinity of GaON/ZnO nanoarchitecture was examined by Mini-X-ray Diffraction (Mini-XRD) with Cu Kα X-ray radiation source (k=0.15406 nm). The surface morphology and composition were identified by field emission scanning electron microscopy (FE-SEM) (Tescan Lyra-3)) and energy dispersion X-ray spectroscopy (EDX) equipped with FE-SEM, respectively. Vibrational spectroscopic information was obtained via Infrared (FT-IR) spectroscopy (measured at room temperature with the Thermo-Fisher device from 600 to 1200 cm$^{-1}$ region). The XPS analysis was performed via V.G. Scientific ESCALAB Mk(II) spectrometer using a non-monochromatic Al source (Kα, 1486.6 eV). The output power was adjusted to 130 W. Before starting, the binding energy (eV) of the device was calibrated with standard reference lines (Cu 2p3/2=932.67 eV, Cu 3p3/2=74.9 eV and Au 4f7/2=83.98 eV). The permitted energy of the electron analyzer was fixed at 10 eV. The energy resolution was about 1.0 eV. Diffuse Reflectance Spectroscopy (DRS) (HORIBA) and Photoluminescence (PL) were utilized to scrutinize optical properties of the pristine ZnO, GaON and their nanoarchitecture.

The photoelectrochemical water splitting performance was examined using a three-electrode photochemical cell supported by a potentiostat (autolab) and solar simulator (ORIEL SOL-3A). The intensity of the artificial light source was calibrated with standard silicon diode (ORIEL) photodevice and tuned at 1 SUN (100 mW/cm$^2$) power. The solar simulator was provided with 1.5 A.M and equipped with UV cut off wavelength (<420 nm) filters. The three-electrode cell contained Platinum (Pt) as a counter electrode, Secondary Calomel Electrode (SCE) as a reference electrode and GaON, ZnO or GaON/ZnO nanoarchitecture photoelectrode as a working electrode. Moreover, 0.5 M sodium sulfate (Na$_2$SO$_4$) solution in DI water was used as an electrolyte for photocurrent density measurements. The scan rate was maintained at 0.05 V/s for Linear Sweep Voltammetry (LSV) between 1.5 V and −1.5 V. The chronoamperometric study was performed at the chopping ON/OFF rate of ~60 s/cycle.

Figure 1B:
FIG. 1B shows slab geometries with O-rich surface orientation without $Zn_3O_3$ cluster.
Figure 1B:
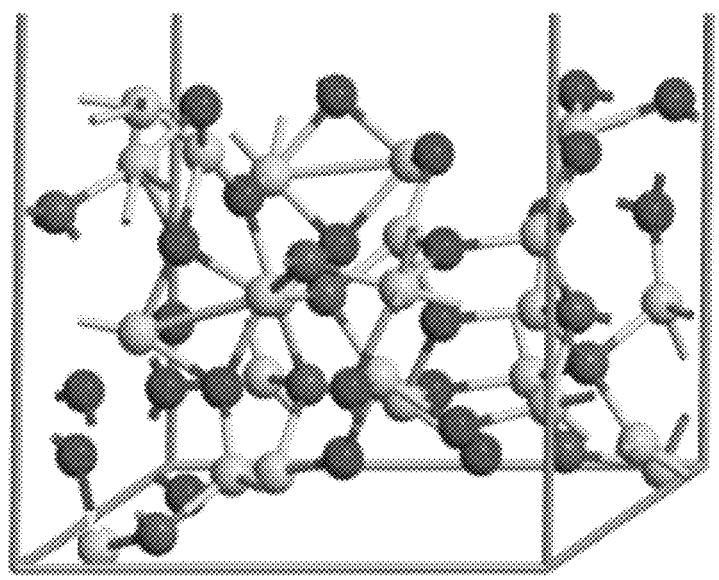
Figure 1C:
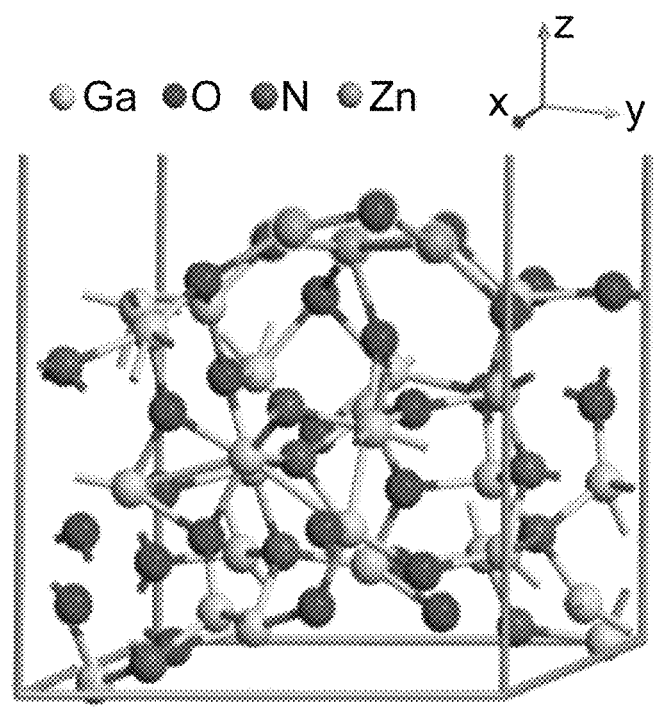
FIG. 1C shows slab geometries with O-rich surface orientation with $Zn_3O_3$ cluster.

DFT calculations were conducted using the generalized gradient approximation of Perdew-Burke-Ernzerhof for the exchange-correlation energy [J. P. Perdew, K. Burke, M. Ernzerhof, Generalized gradient approximation made simple, Phys. Rev. Lett. 77 (1996) 3865-3868, incorporated herein by reference in its entirety]. The Brillouin zone sampling was done using 12×12×12 Monkhorst-Pack k-point sampling for the unit cell of GaON (see FIG. 1A). For the slab geometries (FIGS. 1B and 1C) 12×12×1 k-points were used due to the presence of vacuum spacing more than 10 Å perpendicular to the slabs. The electrostatic potential was determined on a real-space grid with mesh cutoff energy of 150 Ry and double-zeta-polarized basis sets of numerical orbitals were used to describe the atoms. Van der Waals interactions were introduced by Grimme's empirical dispersion correction [S. Grimme, Semiempirical GGA-type density functional constructed with a long-range dispersion correction, J. Comput. Chem. 27 (2006) 1787-1799, incorporated herein by reference in its entirety]. The convergence criterion was 0.01 eV/Å for Hellman-Feynman forces. The adsorption energy of a water molecule is defined as $$E_{ads} = E_{GaON/(GaON+ZnO)+H2O} - E_{GaON/(GaON+ZnO)} - E_{H2O},$$ (equation 1)

where $E_{GaON/(GaON+ZnO)+H_2O}$ is the total energy of GaON/(GaON+ZnO) slab with an adsorbed water molecule, $E_{GaON/(GaON+ZnO)}$ is the overall energy of GaON/(GaON+ZnO) slab and $E_{H_2O}$ is the overall energy of isolated water molecule. All calculations were conducted using the computational package Atomistix toolkit [distributed by QuantumWise company, Copenhagen, Denmark. http://www.quantumwise.com].

EXAMPLE 2

XRD Analysis

Figure 3:
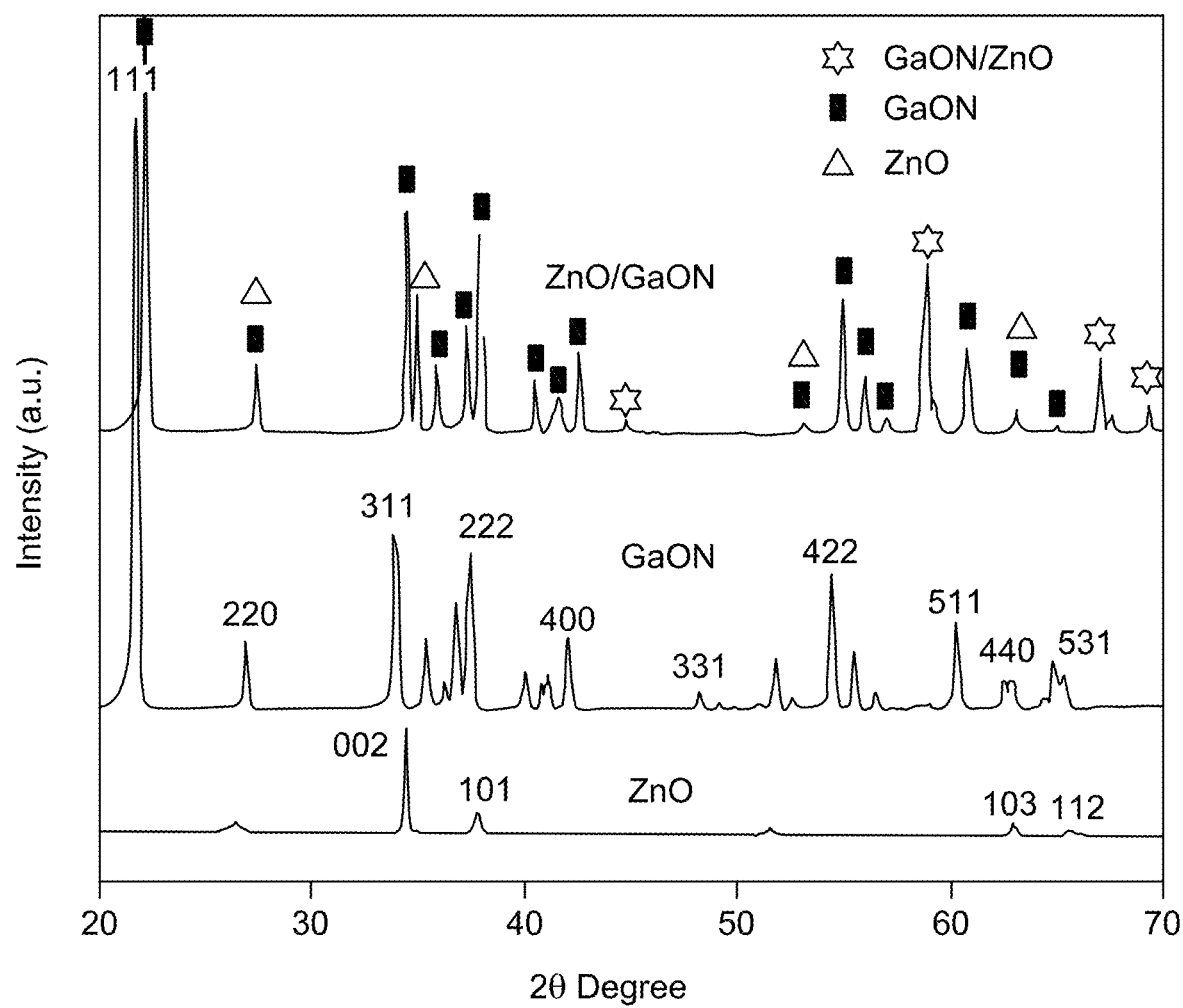
FIG. 3 shows X-ray diffraction (XRD) patterns of ZnO nanorods, GaON nanosheets, and GaON/ZnO nanoarchitecture.

The XRD investigation was useful to understand the crystal phase of the final product, as crystallinity and crystal phase distinctly effect the overall performance of the photoelectrodes [C. S. Chua, D. Ansovini, C. J. J. Lee, Y. T. Teng, L. T. Ong, D. Chi, T. S. A. Hor, R. Raja, Y.-F. Lim, The effect of crystallinity on photocatalytic performance of $Co_3O_4$ water-splitting cocatalysts, Phys. Chem. Chem. Phys. 18 (2016) 5172-5178, incorporated herein by reference in its entirety]. FIG. 3 represents the stacked XRD patterns for GaON, ZnO and GaON/ZnO nanoarchitectures, respectively. The XRD 2θ values for FTO have been subtracted from all results to obtain real XRD patterns for ZnO, GAON and GaON/ZnO nanoarchitecture, respectively. Characteristic intense XRD peak [2 2 2] for ZnO was observed at 2θ=~34° in pristine as well as in GaON/ZnO nanoarchitecture XRD pattern with a slightly lower intensity [H. R. Pant, B. Pant, R. K. Sharma, A. Amarjargal, H. J. Kim, C. H. Park, L. D. Tijing, C. S. Kim, Antibacterial and photocatalytic properties of Ag/$TiO_2$/ZnO nano-flowers prepared by facile one-pot hydrothermal process, Ceram. Int. 39 (2013) 1503-1510, incorporated herein by reference in its entirety]. In addition, other peaks for ZnO also appeared in the nanoarchitecture spectrum at almost the same level as pristine ZnO. Several peaks for GaON could be seen in the GaON/ZnO nanoarchitecture XRD spectrum from 33° to 43°. Some additional peaks were also observed in the nanoarchitecture spectrum, especially at the far end of the XRD spectrum at 44.76°, 59°, 67° and 69.48°. These peaks which were not observed in pristine ZnO and GaON spectra might be due to formation of GaON/ZnO architecture.

EXAMPLE 3

SEM Analysis

Figure 4A:
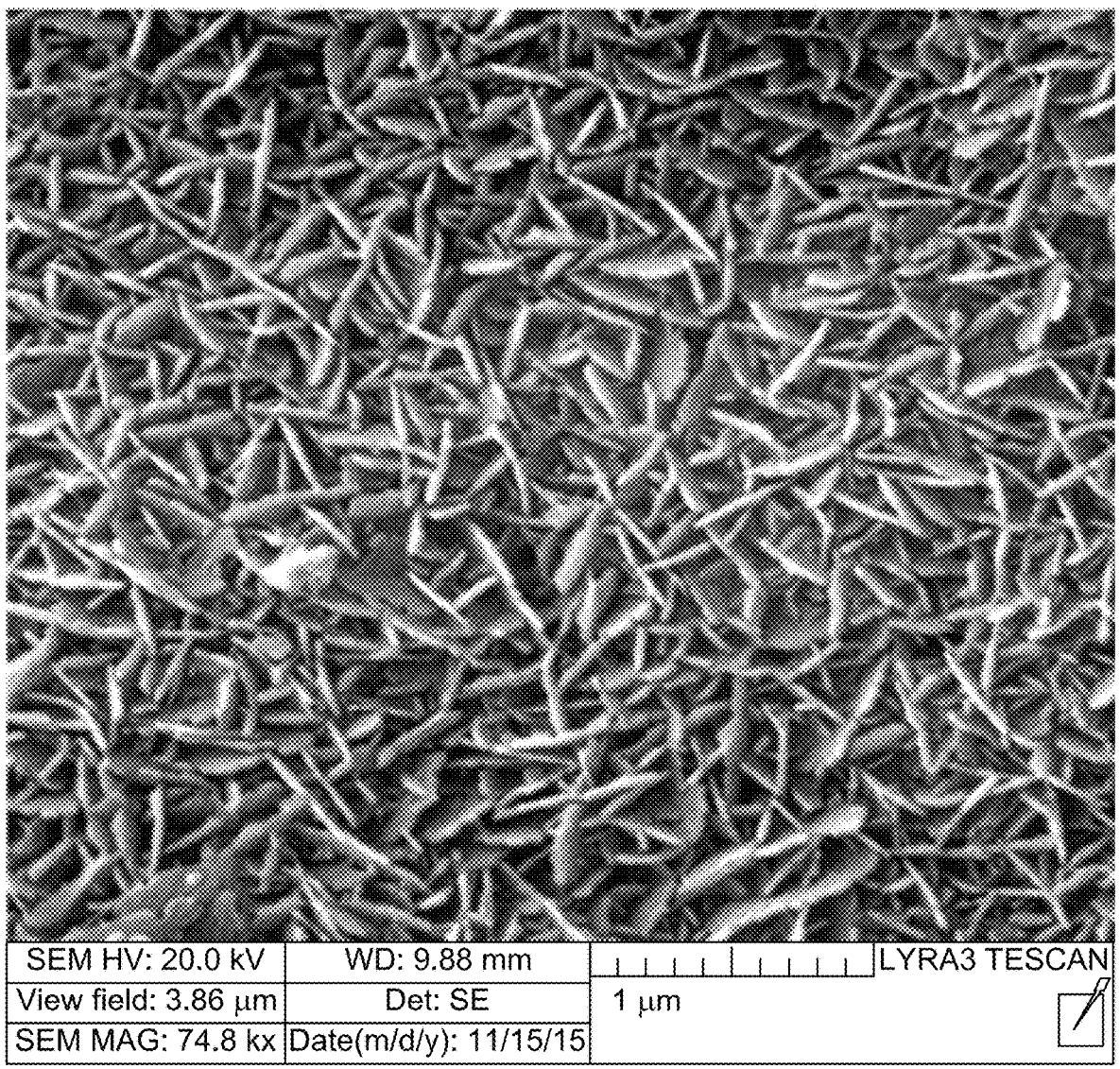
FIG. 4A is a field emission scanning electron microscopy (FE-SEM) image of GaON nanosheets.
Figure 4B:
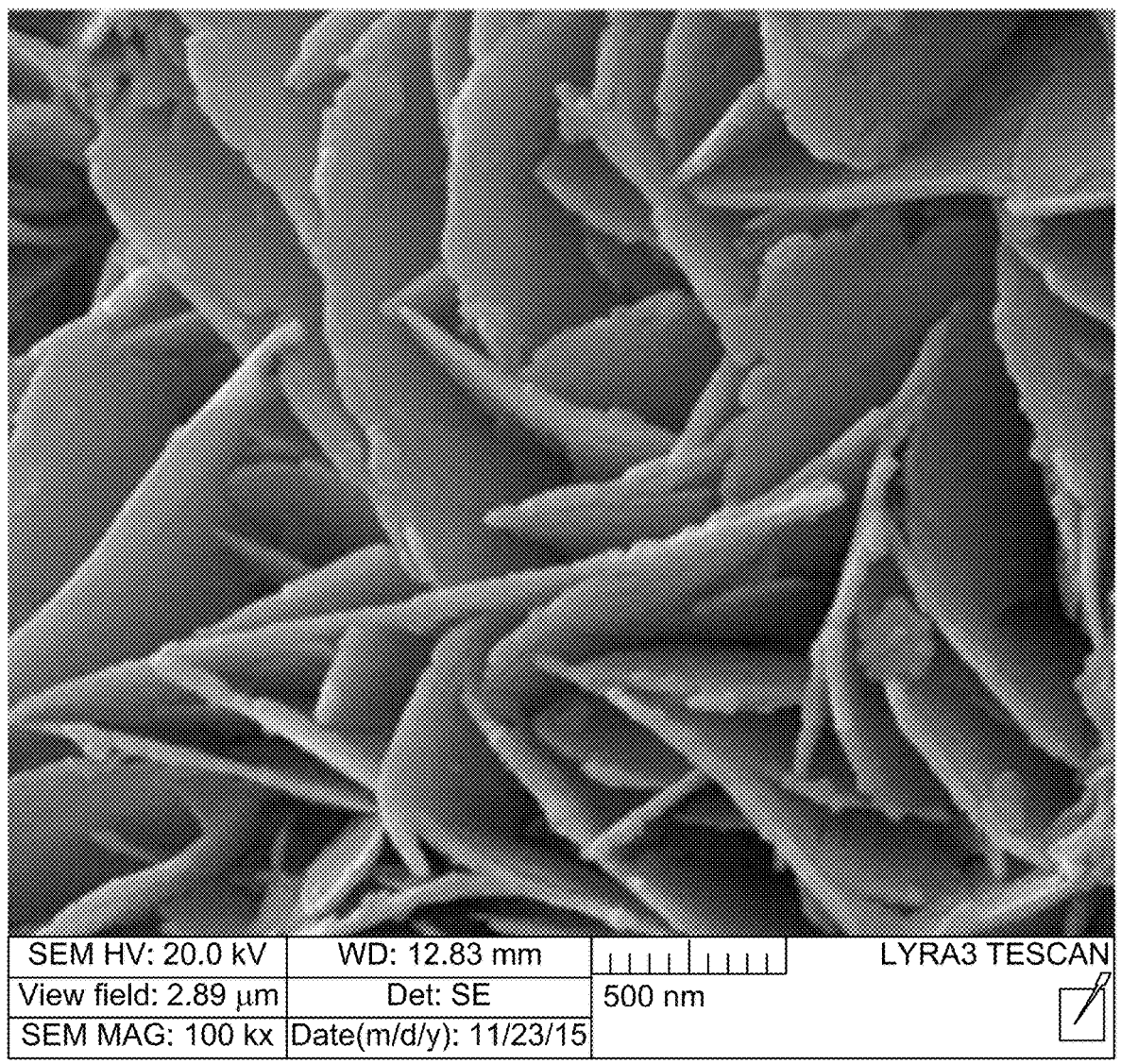
FIG. 4B is a magnified view of the sample in FIG. 4A.
Figure 4C:
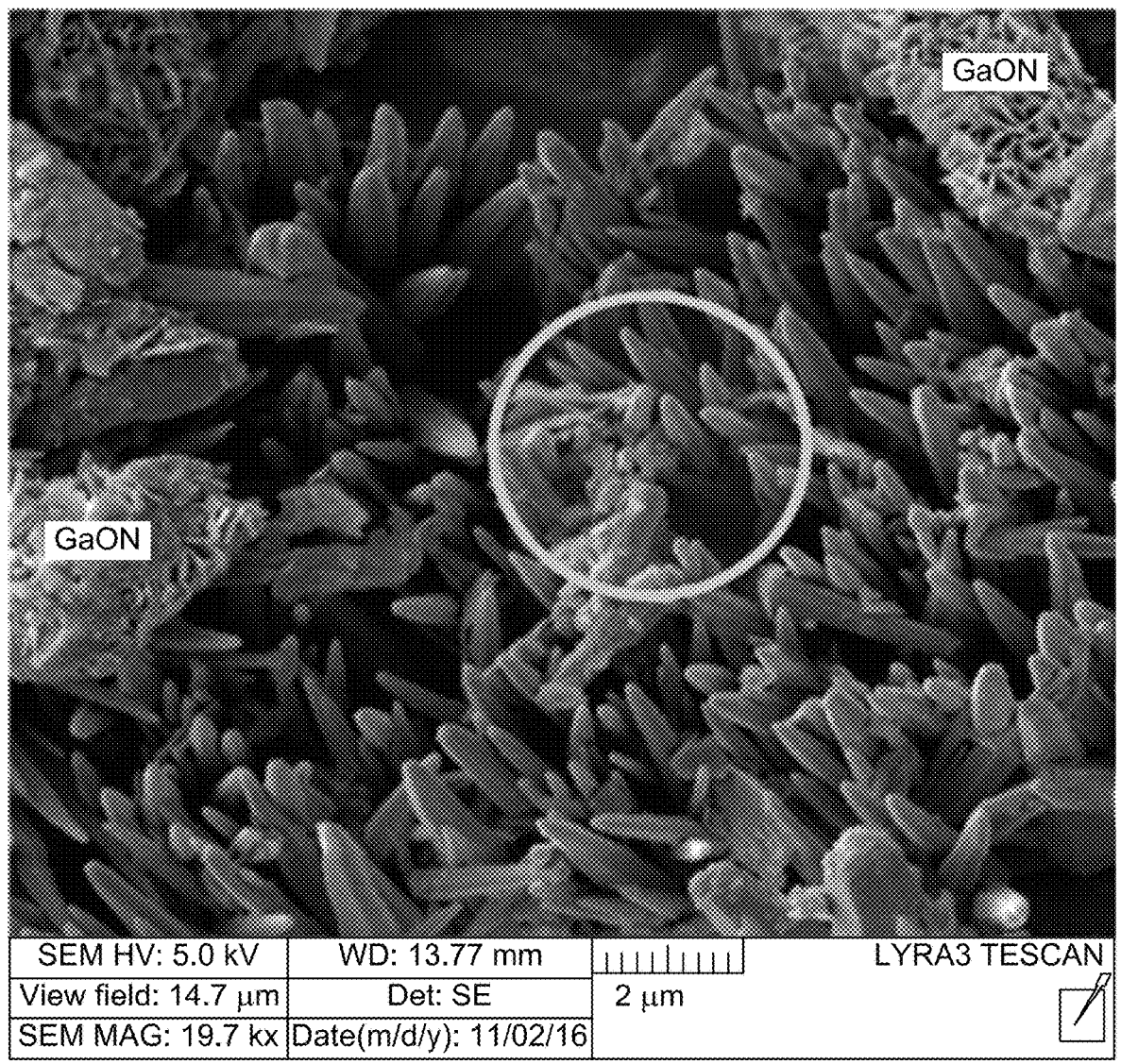
FIG. 4C is a FE-SEM image of GaON/ZnO nanoarchitecture.
Figure 4D:
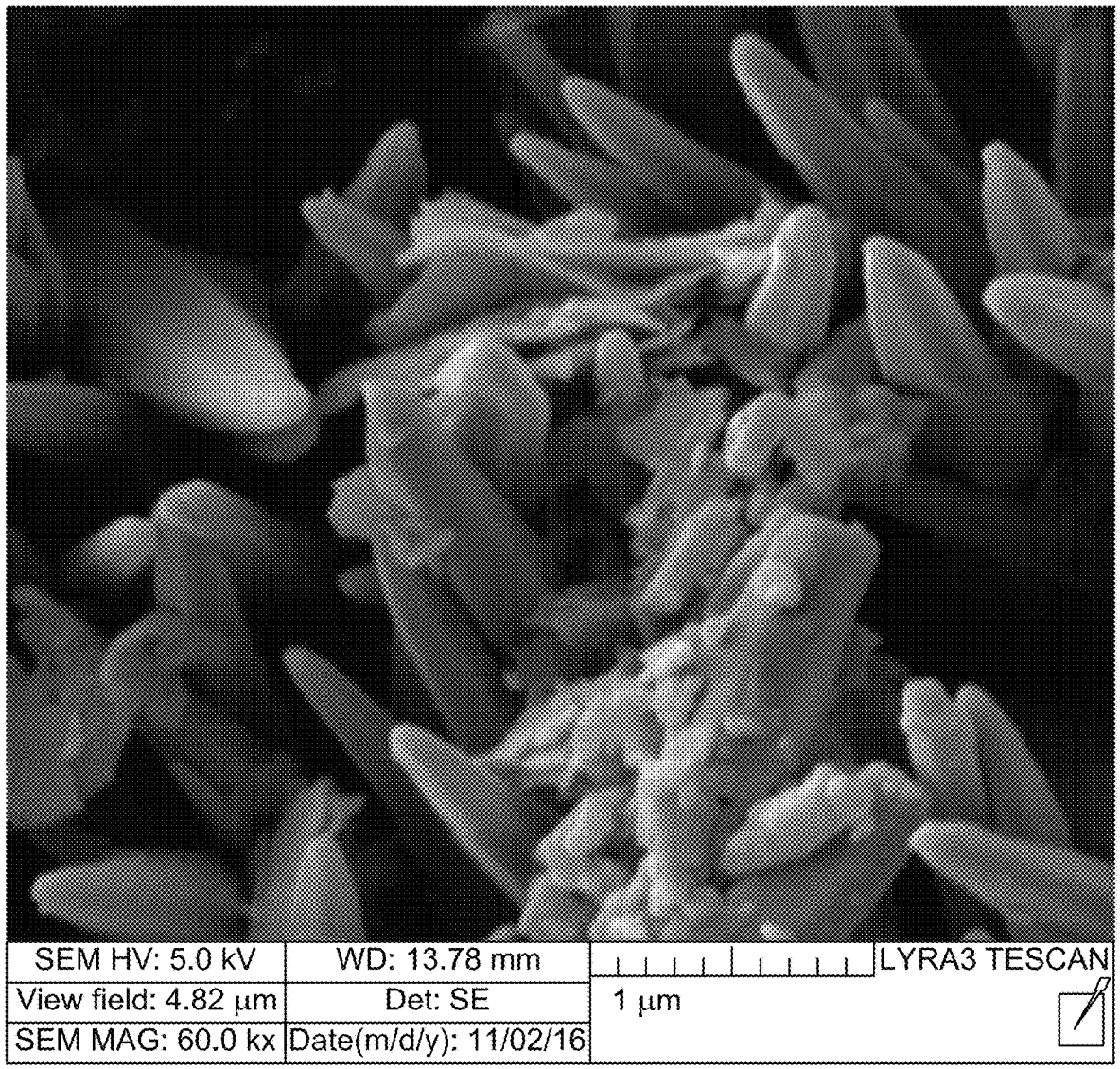
FIG. 4D is a magnified view of the sample in FIG. 4C.

FE-SEM microscopic details were obtained for GaON and GaON/ZnO nanoarchitecture. FIGS. 4A and 4B each represent the low and high magnification FE-SEM images for GaON nanosheets. The nanoflowers sheets morphology with variable sizes and channels like appearance was observed for GaON. Moreover, FIGS. 4C and 4D show the GaON/ZnO nanoarchitecture distribution at lower and higher resolution. The images demonstrated a clear intercalation of the two materials at the nanoscale level. The ZnO NRs could be seen bulging out from GaON nanosheets in the micrographs in an interposing pattern.

EXAMPLE 4

EDX Analysis

Figure 5A:
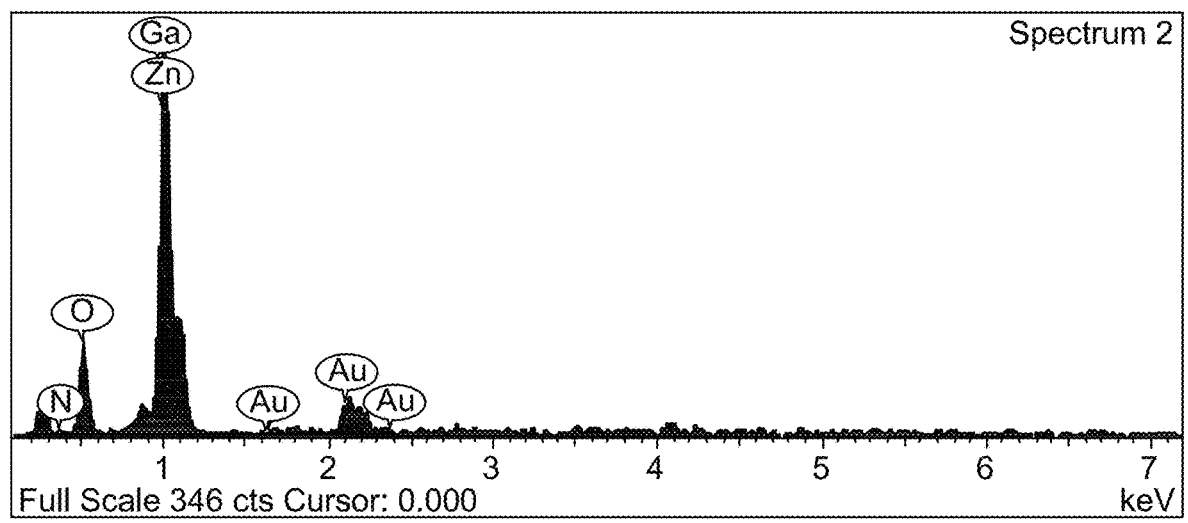
FIG. 5A shows an energy-dispersive X-ray spectroscopy (EDX) analysis of GaON/ZnO nanoarchitecture.
Figure 5B:
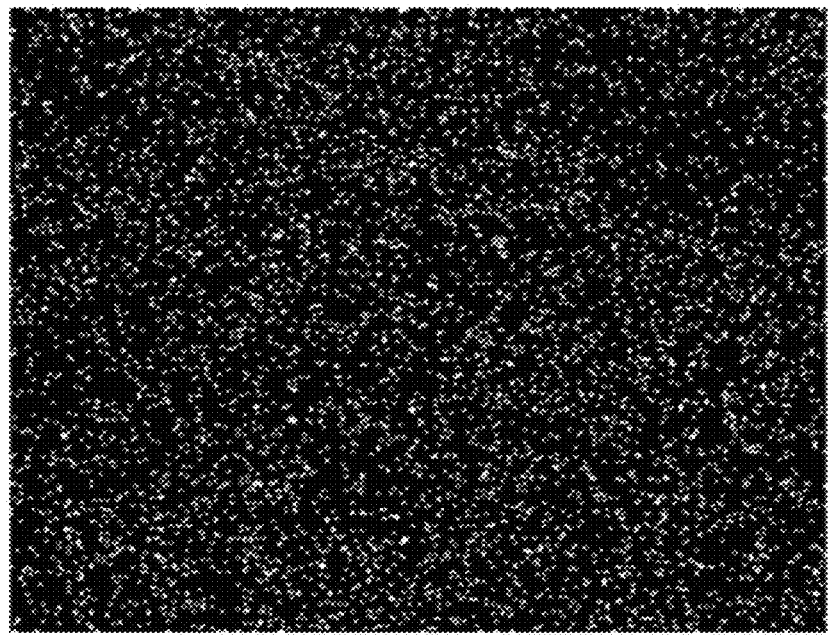
FIG. 5B shows a Zn elemental mapping of GaON/ZnO nanoarchitecture.
Figure 5C:
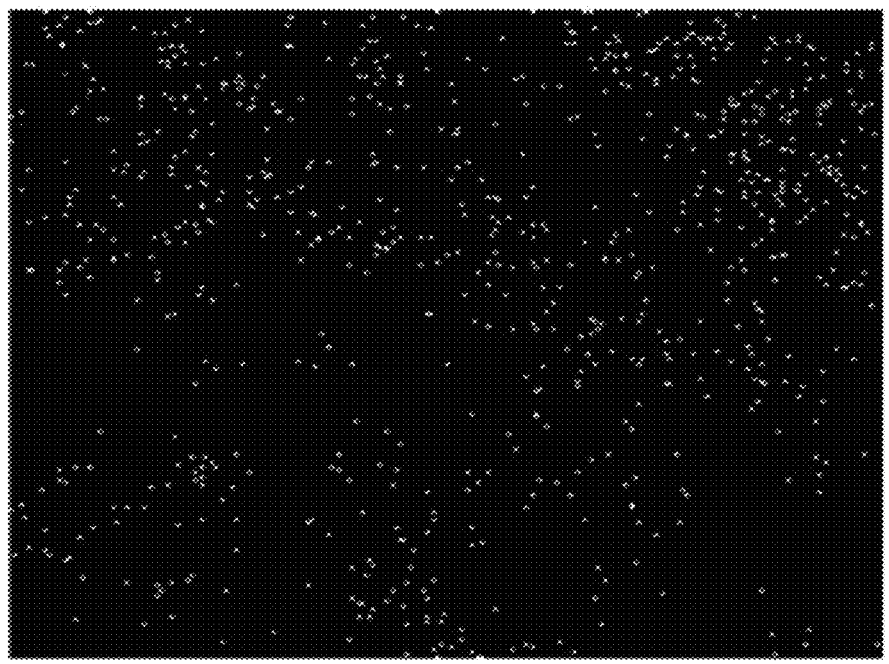
FIG. 5C shows an O elemental mapping of GaON/ZnO nanoarchitecture.
Figure 5D:
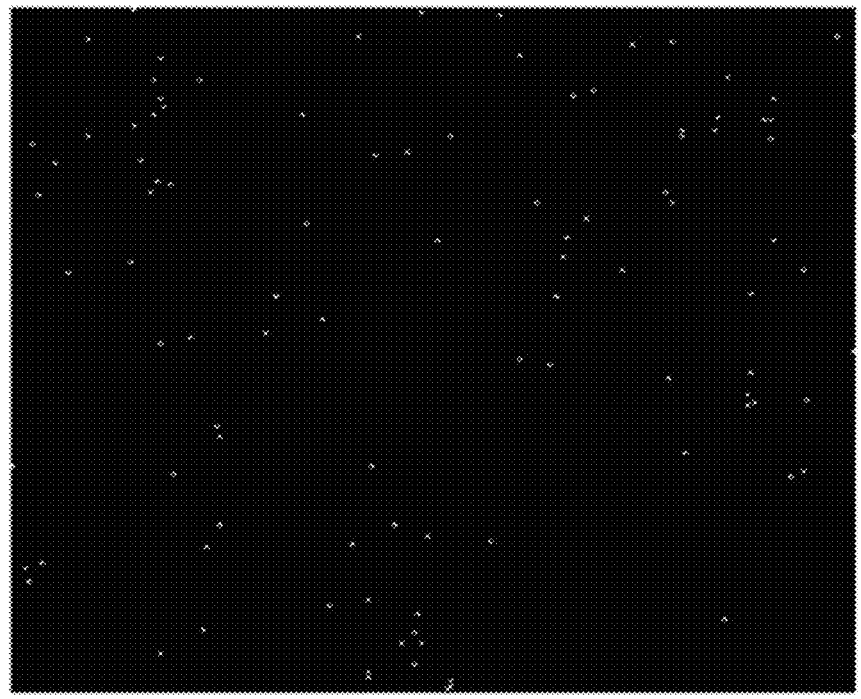
FIG. 5D shows an N elemental mapping of GaON/ZnO nanoarchitecture.
Figure 5E:
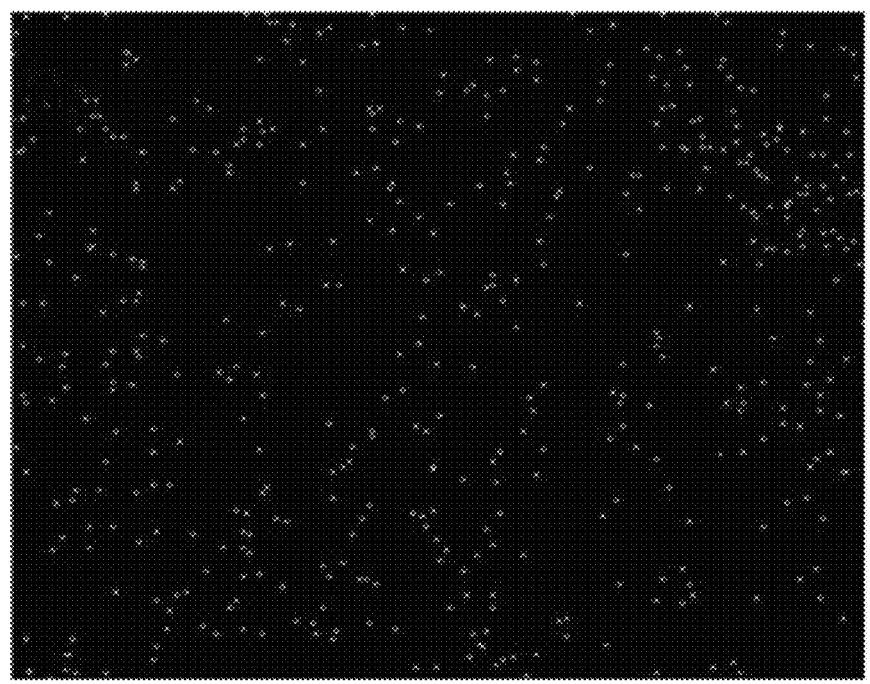
FIG. 5E shows a Ga elemental mapping of GaON/ZnO nanoarchitecture.

The EDX and elemental mapping in FIG. 4 detected the presence of nitrogen in GaON. These Figures also provided further details about the nanoarchitecture comprising GaON nanosheets and ZnO nanorods. EDX spectrum in FIG. 5A displayed known peaks for Zn, Ga, 0 and N. The quantitative ratio indicated that nitrogen existed in a significant amount (~3%) in the final product. Mapping results in FIGS. 5B-E supported the EDX results and mapped area showed a significant distribution of nitrogen entities in the nanoarchitecture. Other nitrogen-doped materials were extensively studied for water splitting applications [C. K. Chen, Y. Shen, H. M. Chen, C. Chen, T. Chan, J. Lee, R. Liu, Quantum-dot-sensitized nitrogen-doped ZnO for efficient photoelectrochemical water splitting, Eur. J. Inorg. Chem. 2014 (2014) 773-779, incorporated herein by reference in its entirety].

EXAMPLE 5

XPS Analysis

Figure 6A:
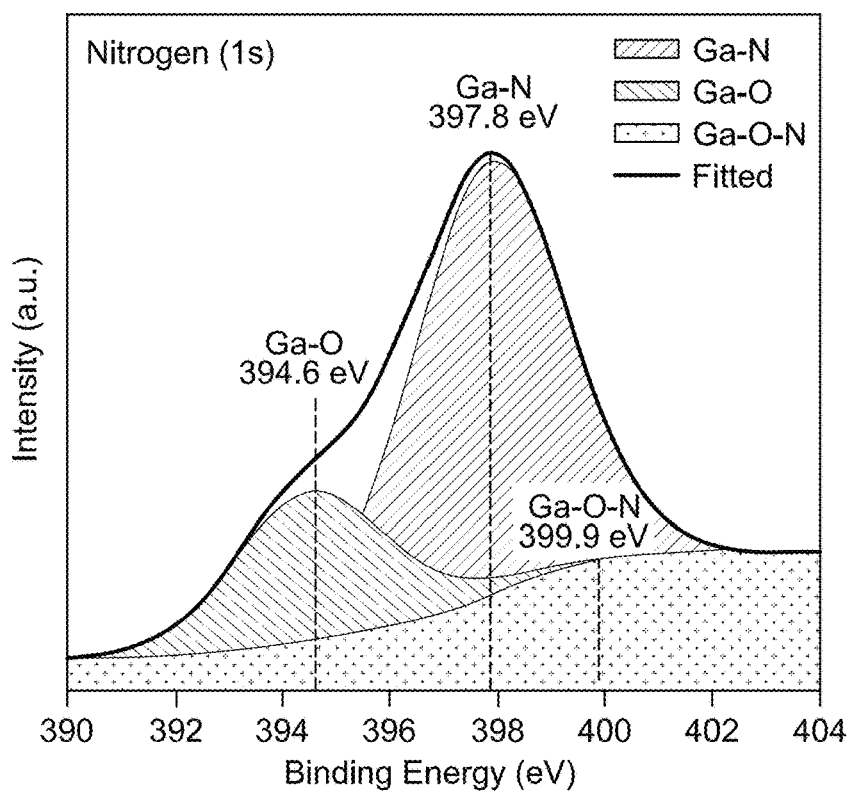
FIG. 6A shows an X-ray photoelectron spectroscopy (XPS) spectrum of GaON/ZnO nanoarchitecture for nitrogen (1s).
Figure 6B:
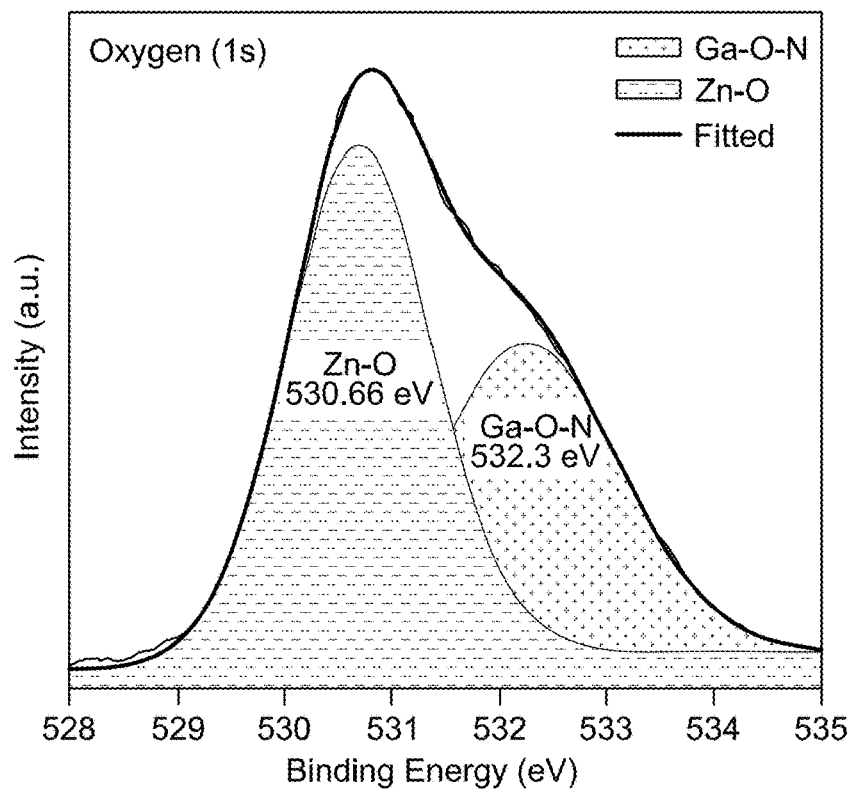
FIG. 6B shows an X-ray photoelectron spectroscopy (XPS) spectrum of GaON/ZnO nanoarchitecture for oxygen (1s).
Figure 6C:
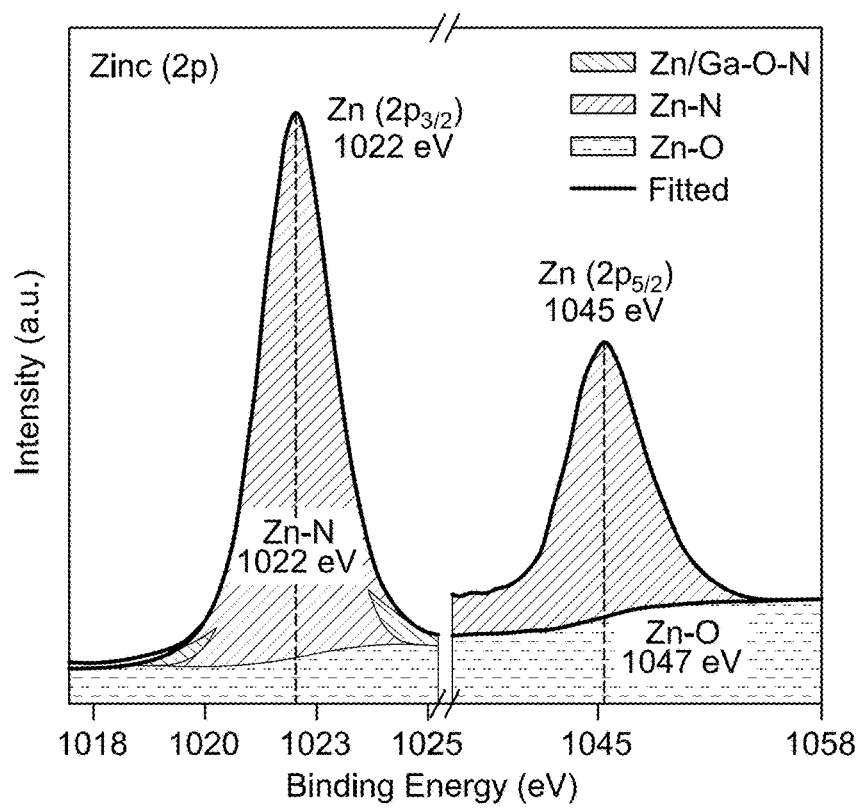
FIG. 6C shows an X-ray photoelectron spectroscopy (XPS) spectrum of GaON/ZnO nanoarchitecture for zinc (2p).
Figure 6D:
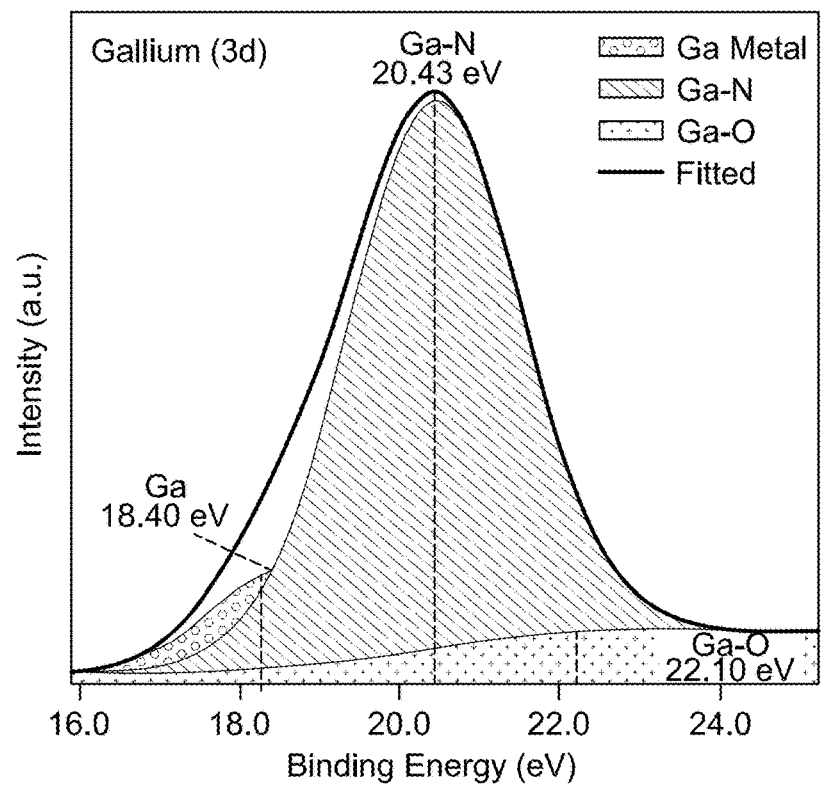
FIG. 6D shows an X-ray photoelectron spectroscopy (XPS) spectrum of GaON/ZnO nanoarchitecture for gallium (3d).
Figure 6E:
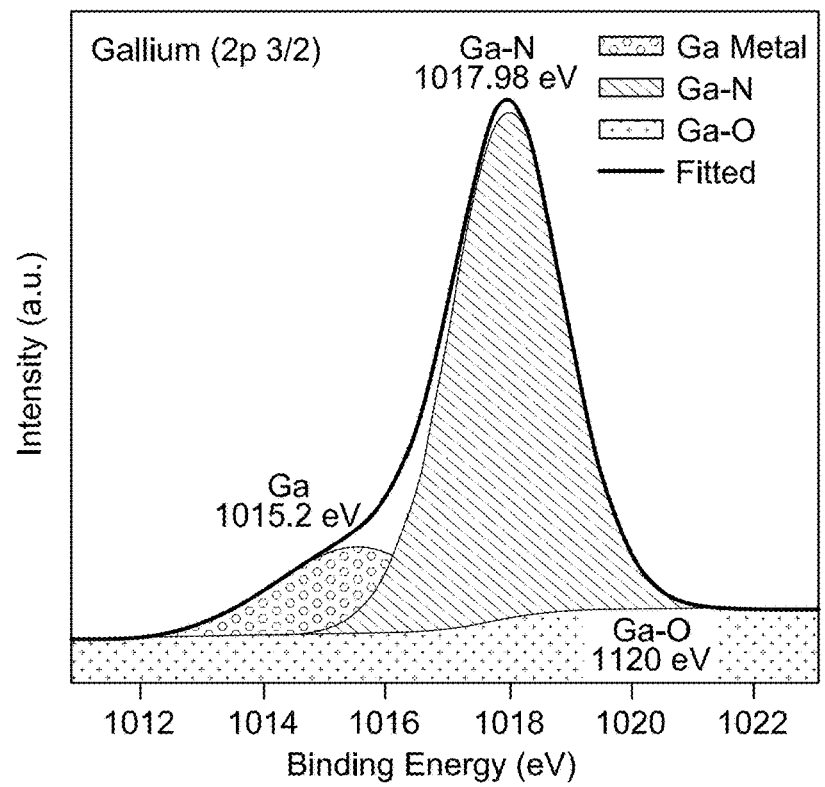
FIG. 6E shows an X-ray photoelectron spectroscopy (XPS) spectrum of GaON/ZnO nanoarchitecture for gallium (2p 3/2).

XPS profiling was carried out to explore the nature of bonding and to detect the existence of nitrogen in the GaON/ZnO product. The core level fitted/deconvoluted XPS spectra (blue lines) of the elemental components of GaON/ZnO were indicated in FIGS. 6A-E. FIG. 6A showed broader fitted XPS binding energy peak for nitrogen (is) lies from 390 to 402 eV. The fitted peaks covered three sub-peaks, which can be assigned to Ga—O (394.6 eV), Ga—N (397.5 eV) and Ga—O—N (399.9 eV) bonding after comparing with available literature [K. Maeda, T. Takata, M. Hara, N. Saito, Y. Inoue, H. Kobayashi, K. Domen, GaN:ZnO solid solution as a photocatalyst for visible-light-driven overall water splitting, J. Am. Chem. Soc. 127 (2005) 8286-8287; and Z. Wang, B. Huang, L. Yu, Y. Dai, P. Wang, X. Qin, X. Zhang, J. Wei, J. Zhan, X. Jing, H. Liu, M.-H. Whangbo, Enhanced ferromagnetism and tunable saturation magnetization of Mn/C-codoped GaN nanostructures synthesized by carbothermal nitridation, J. Am. Chem. Soc. 130 (2008) 16366-16373, each incorporated herein by reference in their entirety]. The characteristic oxygen (1 s) XPS peak was observed at 528-535 eV and deconvolution showed two sub-peaks. These peaks might be assigned to Zn—O (530.66 eV) and Ga—O—N (532.3 eV) bonds (FIG. 6B) [W. Wei, Z. Qin, S. Fan, Z. Li, K. Shi, Q. Zhu, G. Zhang, Valence band offset of β-$Ga_2O_3$/wurtzite GaN heterostructure measured by X-ray photoelectron spectroscopy, Nanoscale Res. Lett. 7 (2012) 562, incorporated herein by reference in its entirety]. The observed Zn ($2p_{1/2}$) and ($2p_{3/2}$) distinctive binding peaks at 1022 and 1045 eV were revealed in FIG. 6C. These peaks substantiated that the Zn existed in the $Zn^{2+}$ state in GaON/ZnO nanoarchitecture, thus the oxidation state of Zn remained unchanged [S. J. Wilkins, T. Paskova, A. Ivanisevic, Modified surface chemistry, potential, and optical properties of polar gallium nitride via long chained phosphonic acids, Appl. Surf. Sci. 327 (2015) 498-503, incorporated herein by reference in its entirety]. The Gallium elemental XPS peaks for Ga (3d) and ($2p_{3/2}$) were observed in 16-24 eV and 1012-1022 eV regions, respectively (see FIGS. 6D and 6E). The peaks resolved into three sub-peaks i.e., the red and green highlighted areas under that were consigned to Ga—N and Ga—O bonding correspondingly, the black highlighted peaks represented some of the traces of unreacted Ga metal.

EXAMPLE 6

FT-IR Analysis

Figure 7:
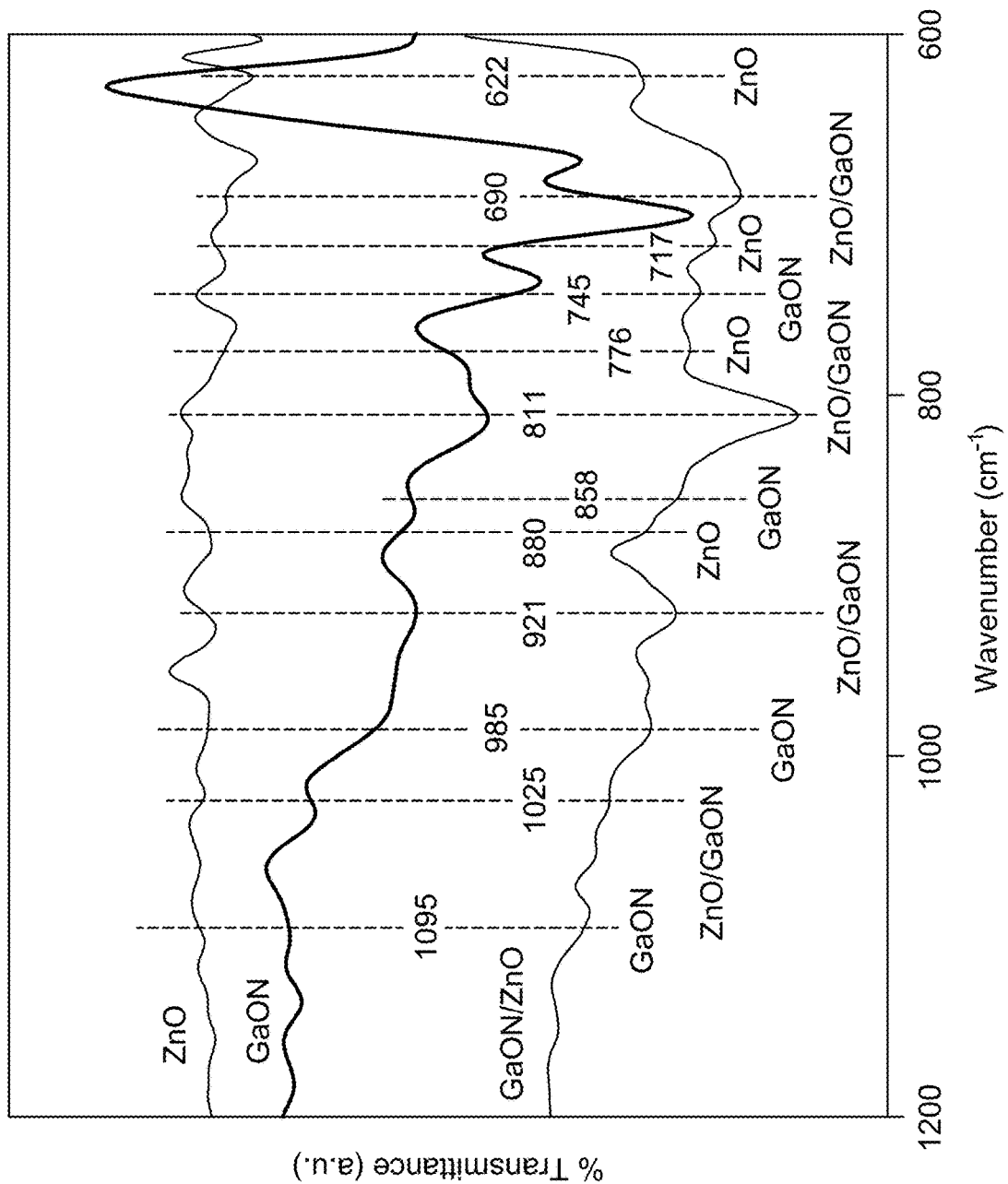
FIG. 7 is an overlay of Fourier-transform Infrared (FTIR) vibrational spectra of ZnO nanorods, GaON nanosheets, and GaON/ZnO nanoarchitecture.

Comparative FT-IR results can be helpful to observe the variations in the vibrational properties of GaON/ZnO from pristine GaON nanosheets and ZnO NRs. The stacked IR spectra for GaON, ZnO and GaON/ZnO NRAs, respectively, were provided in FIG. 7. The peaks appeared in ZnO spectrum at 925 $cm^{-1}$ and 883 $cm^{-1}$ were reported for Zn—O vibrational stretching due to Zn—O lattice. These peaks were slightly shifted towards higher frequencies in GaON/ZnO spectrum to 921 cm$^{-1}$ and 880 cm$^{-1}$. These significant shifts could be associated to the generation of new bonds in the GaON/ZnO [H. R. Pant, B. Pant, R. K. Sharma, A. Amarjargal, H. J. Kim, C. H. Park, L. D. Tijing, C. S. Kim, Antibacterial and photocatalytic properties of Ag/TiO$_2$/ZnO nano-flowers prepared by facile one-pot hydrothermal process, Ceram. Int. 39 (2013) 1503-1510, incorporated herein by reference in its entirety]. By looking to the indexed values in GaON/ZnO spectrum, it could be observed that the spectral vibrational peaks of GaON also appeared at slightly shifted positions compared to the original GaON spectrum by 3-5 cm$^{-1}$ at 1098, 985, 858, 745 cm$^{-1}$ as well as a broadened peak around 665 cm$^{-1}$. This provided an evidence for the formation of the nanoarchitecture. The photoactive GaON/ZnO spectrum also showed new peaks, which appeared due to the mixing of GaON and ZnO vibrational modes. The peaks appeared at 1025, 921, 811 and 690 cm$^{-1}$ were assigned to GaON/ZnO composite.

EXAMPLE 7

Optical Properties

Figure 8A:
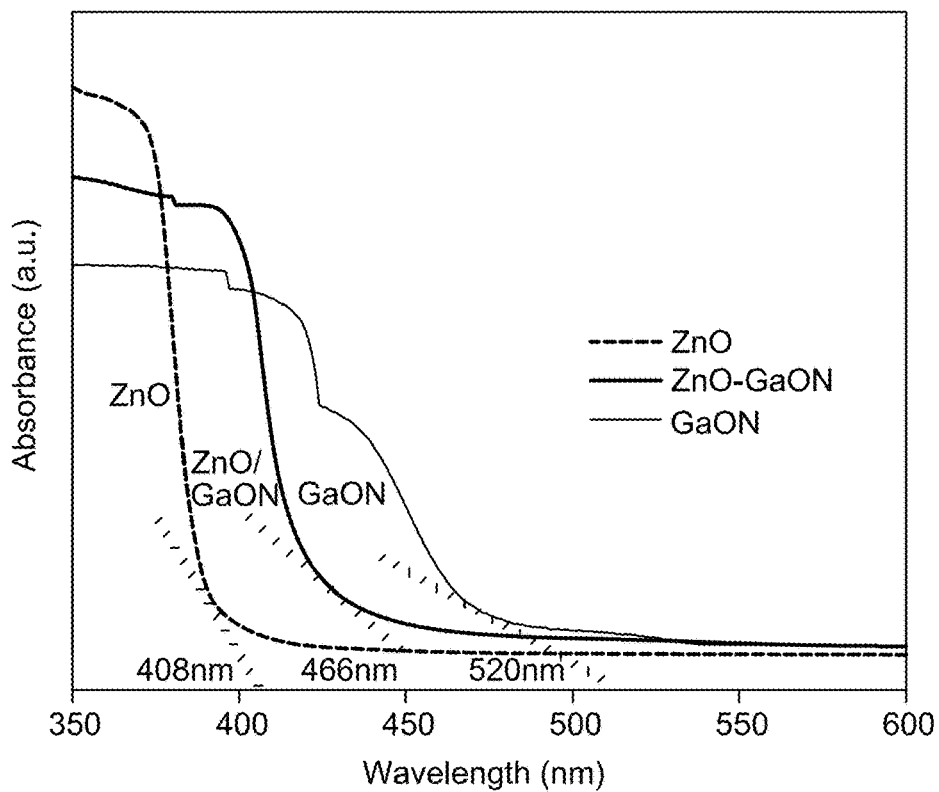
FIG. 8A is an overlay of diffuse reflectance ultraviolet-visible (DRS-UV-vis) absorption spectra of ZnO nanorods, GaON nanosheets, and GaON/ZnO nanoarchitecture.
Figure 8B:
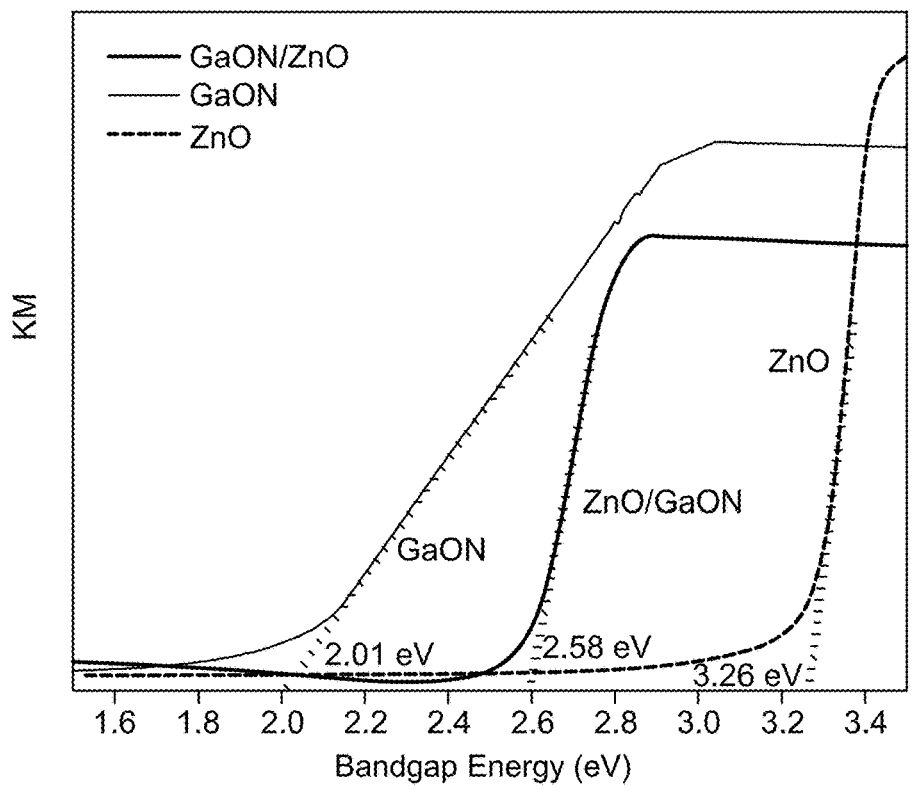
FIG. 8B is an overlay of Kubelka-Munk (KM) bandgap energies of ZnO nanorods, GaON nanosheets, and GaON/ZnO nanoarchitecture.

Optical properties are of considerable importance as they provide crucial understanding on bandgap, which is necessary for assessing solar-driven water splitting performance [H. Yan, X. Wang, M. Yao, X. Yao, Band structure design of semiconductors for enhanced photocatalytic activity: the case of TiO$_2$, Prog. Nat. Sci. Mater. Int 23 (2013) 402-407, incorporated herein by reference in its entirety]. One can predict bandgap values based on the absorption edge. UV/Vis-DRS spectra in FIG. 8A showed the effect of GaON on ZnO absorption edge. The ZnO spectrum indicated a redshift towards higher wavelength in the visible region with GaON loading. The approximate absorption edges for ZnO, GaON/ZnO, and GaON were found at 408, 465 and 530 nm, which corresponded to 3.26, 2.58 and 2.01 eV bandgap, respectively, (FIG. 8B) using Kubelka-Munk equation [R. Beranek, H. Kisch, Tuning the optical and photoelectrochemical properties of surface-modified TiO$_2$, Photochem. Photobiol. Sci. 7 (2008) 40-48, incorporated herein by reference in its entirety]. Materials with a small bandgap may be useful for photocatalytic applications, as these materials can efficiently absorb the visible light region of electromagnetic radiation [M. W. Shah, Y. Zhu, X. Fan, J. Zhao, Y. Li, Facile synthesis of defective TiO$_{2-x}$ nanocrystals with high surface area and tailoring bandgap for visible-light photocatalysis, Nat. Publ. Gr. (2015) 1-8, incorporated herein by reference in its entirety]. For water splitting reaction, the appropriate bandgap is determined to be around 2 eV [A. J. Nozik, Chapter 13. Novel Approaches to Water Splitting by Solar Photons, (2013), pp. 359-388, incorporated herein by reference in its entirety]. The decrease in the bandgap of GaON/ZnO nanoarchitecture could be ascribed to the intermixing of the bandgap levels of higher bandgap ZnO (3.24 eV) with lower bandgap GaON (2.01 eV). Both of these materials advanced their valance and conductance band in the GaON/ZnO nanoarchitecture [K. M. Domen, Particulate Oxynitrides for Photocatalytic Water Splitting Under Visible Light, 2013, pp. 109-131, incorporated herein by reference in its entirety]. The lowest bandgap, i.e. 2.58 eV in case of GaON/ZnO is suitable for photoelectrochemical water splitting applications.

Figure 8C:
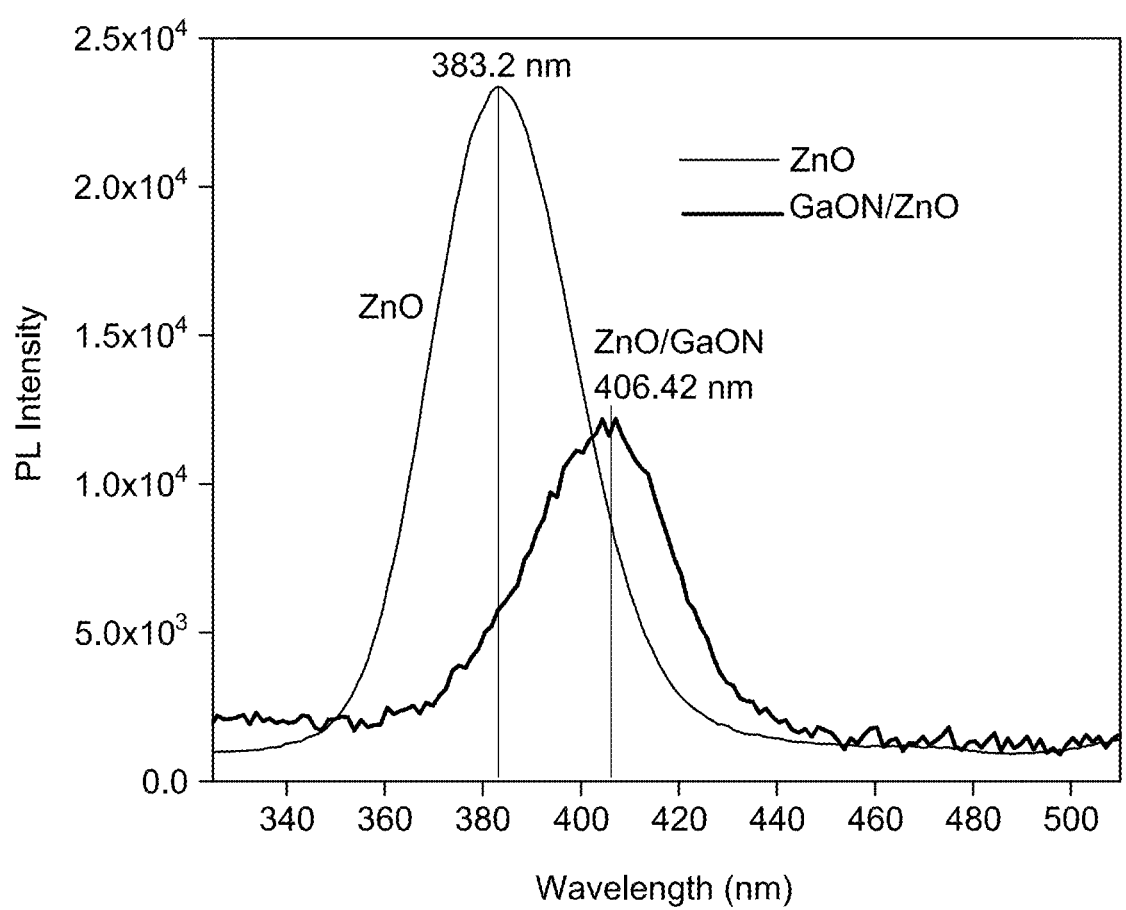
FIG. 8C is an overlay of photoluminescence spectra of ZnO nanorods, and GaON/ZnO nanoarchitecture.

Additionally, photoluminescence studies also provide essential information about the lifetime and recombination of photogenerated excitons [T. Tachikawa, T. Ochi, Y. Kobori, Crystal-face-dependent charge dynamics on a BiVO$_4$ photocatalyst revealed by single-particle spectroelectrochemistry, ACS Catal. 6 (2016) 2250-2256, incorporated herein by reference in its entirety]. The photoluminescence (PL) spectrum of ZnO and GaON/ZnO were indicated in FIG. 8C, which distinctly showed substantial quenching of ZnO by an almost double fold in nanoarchitecture with GaON, with wavelength shifting from 383 nm to 406 nm. The PL quenching had a direct effect on the overall lifetime of excitons and recombination rates, and hence the spectrum showed an improved lifetime for GaON/ZnO excitons compared to pristine ZnO. The shift towards higher wavelength indicated that GaON was effectively embedded in the structure and therefore affected the overall optical properties [J.-H. Park, A. Mandal, S. Kang, U. Chatterjee, J. S. Kim, B.-G. Park, M.-D. Kim, K.-U. Jeong, C.-R. Lee, Hydrogen generation using non-polar coaxial InGaN/GaN multiple quantum well structure formed on hollow n-GaN nanowires, Sci. Rep. 6 (2016) 31996, incorporated herein by reference in its entirety].

EXAMPLE 8

Photoelectrochemical Properties

Figure 9A:
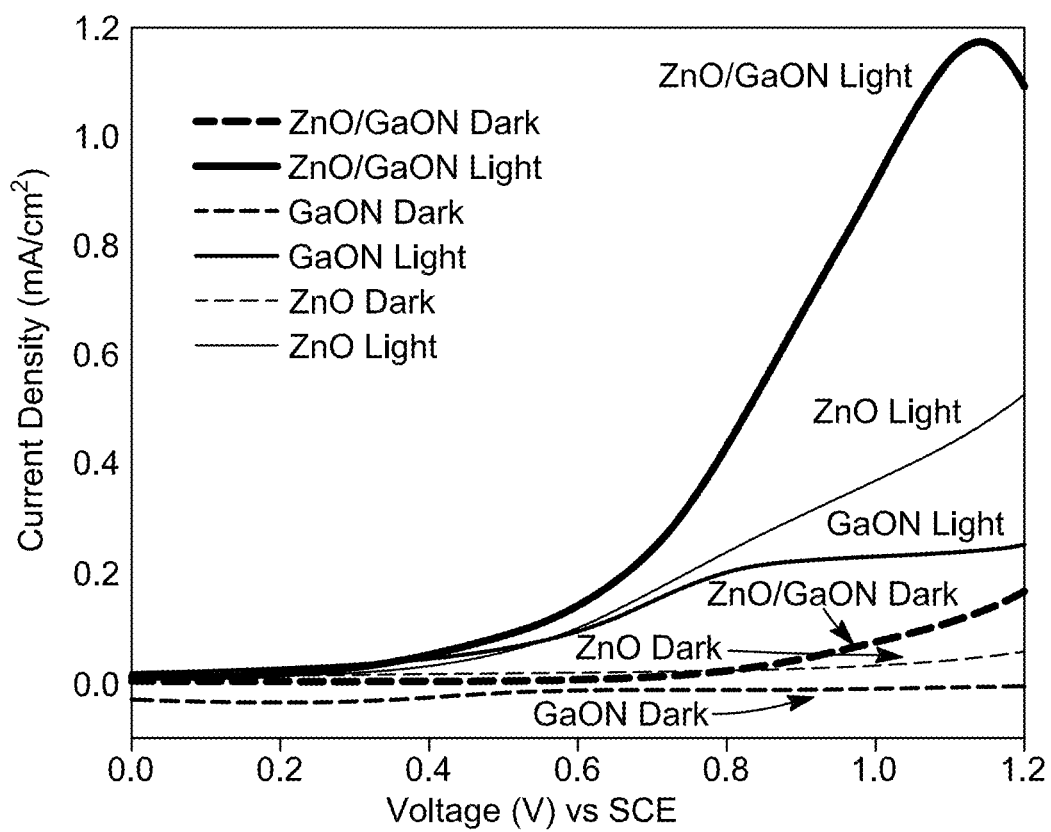
FIG. 9A is an overlay of linear sweep voltammograms (LSV) of ZnO nanorods, GaON nanosheets, and GaON/ZnO nanoarchitecture deposited over FTO substrate, in a standard three electrode system under dark ("Dark") and simulated solar light (1 SUN) ("Light").
Figure 9B:
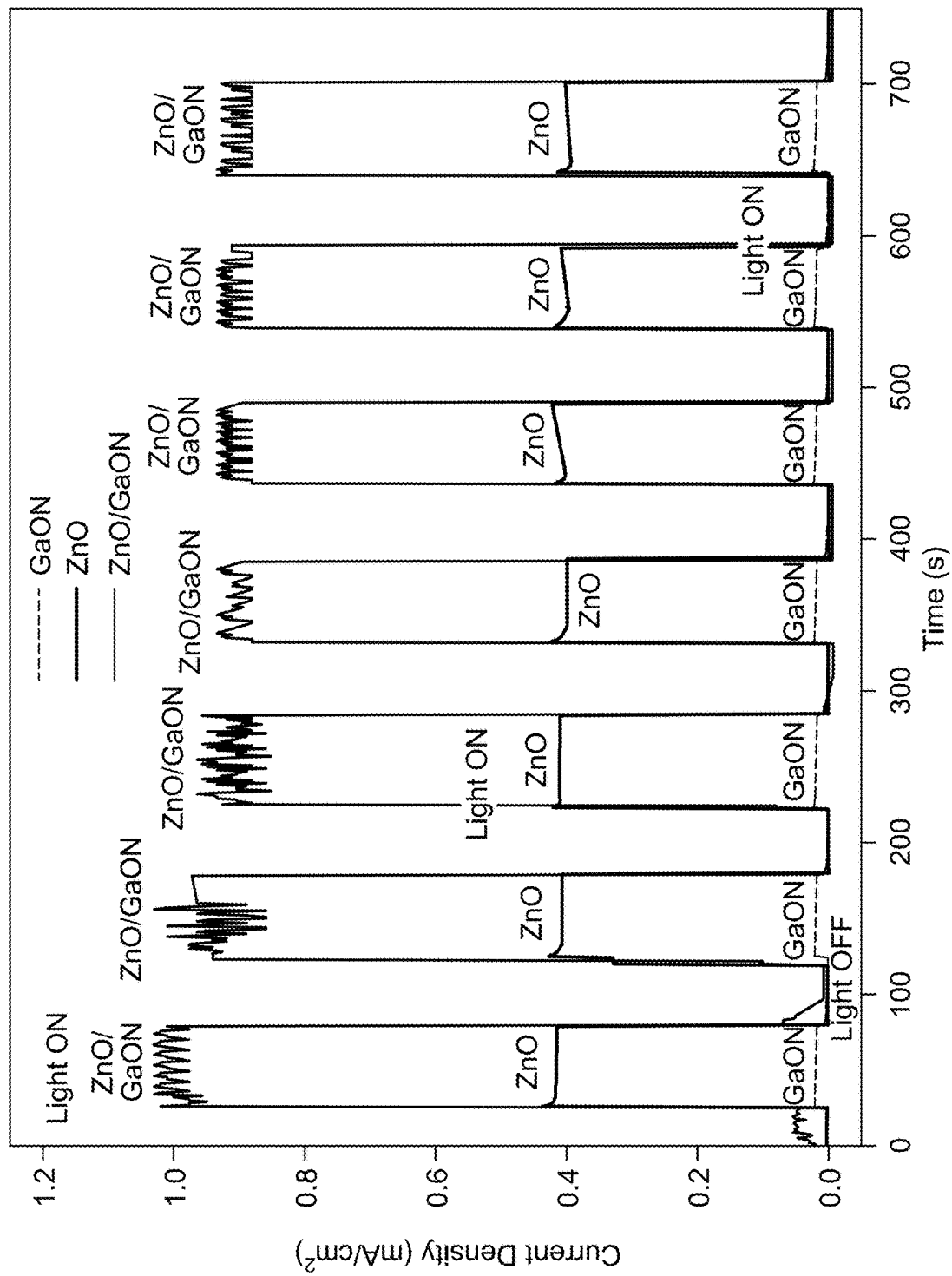
FIG. 9B is an overlay of chronoamperometric measurements of ZnO nanorods, GaON nanosheets, and GaON/ZnO nanoarchitecture deposited over FTO substrate in which photocurrent densities were recorded at 1.23 V vs. saturated calomel electrode (SCE) bias in a standard three electrode system under dark ("Light OFF") and simulated solar light (1 Sun) ("Light ON").
Figure 9C:
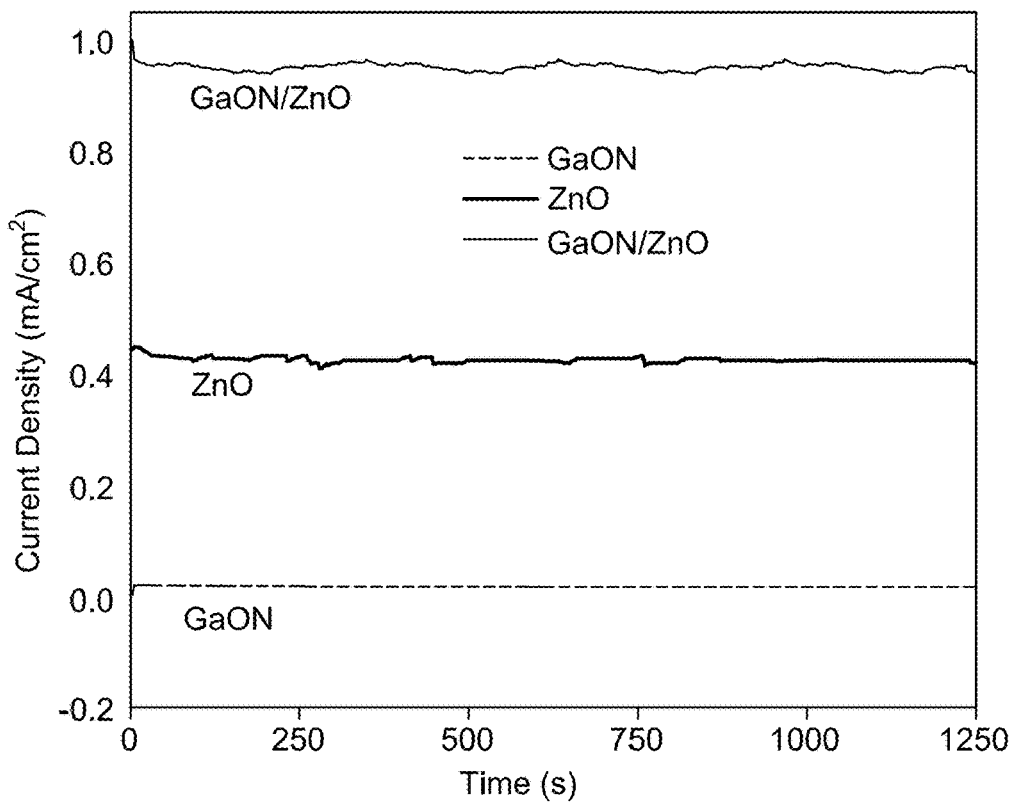
FIG. 9C shows stability measurements of ZnO nanorods, GaON nanosheets, and GaON/ZnO nanoarchitecture deposited over FTO substrate by monitoring their current densities over a period of 1250 seconds.

The photoelectrochemical results were collected in the form of LSV and chronoamperometry graphs. FIG. 9A presented the LSV results, which clearly indicated no significant dark current at first instant as indicated by the dotted lines. Under electromagnetic illumination, the current densities jumped considerably as indicated by the solid lines. As the voltage increased, the current density values increased accordingly. A significant elevation in current density could be observed for GaON/ZnO nanoarchitectures at onset potential of 0.6 V as compare to pristine GaON and ZnO and reached to saturation at 1.1 V. The comparative photocurrent values for pristine GaON, pristine ZnO, and GaON/ZnO were measured to be 0.2, 0.45, and 1.2 mA/cm$^2$, respectively, at 1.2 V bias potential. Thus, it was clear that GaON improved the photocurrent of ZnO from 0.45 to 1.2 mA/cm$^2$, which was more than 2-folds increase under the light. FIG. 9B showed the periodic chronoamperometric photocurrent results of GaON, ZnO and GaON/ZnO at 1.0 V bias voltage under light and dark. The light was provided for ~60 s, followed by the dark interval of ~60 s. These results are in accordance with the LSV measurements and a significant increase in current densities was observed under the light. The GaON/ZnO nanoarchitecture showed a maximum jump at 0.95-1.0 mA/cm$^2$ in almost all cycles, which is about 2.4 times higher than ZnO (~0.42 mA) and several times higher than GaON (0.018 mA). These results also revealed that even after many cycles, the nanoarchitecture showed good stability. FIG. 9C represents the stability measurement for the materials. The stability line remained almost stable after several minutes and the current density for GaON/ZnO nanoarchitecture only dropped from 0.97 to 0.96 mA/cm$^2$.

Figure 9D:
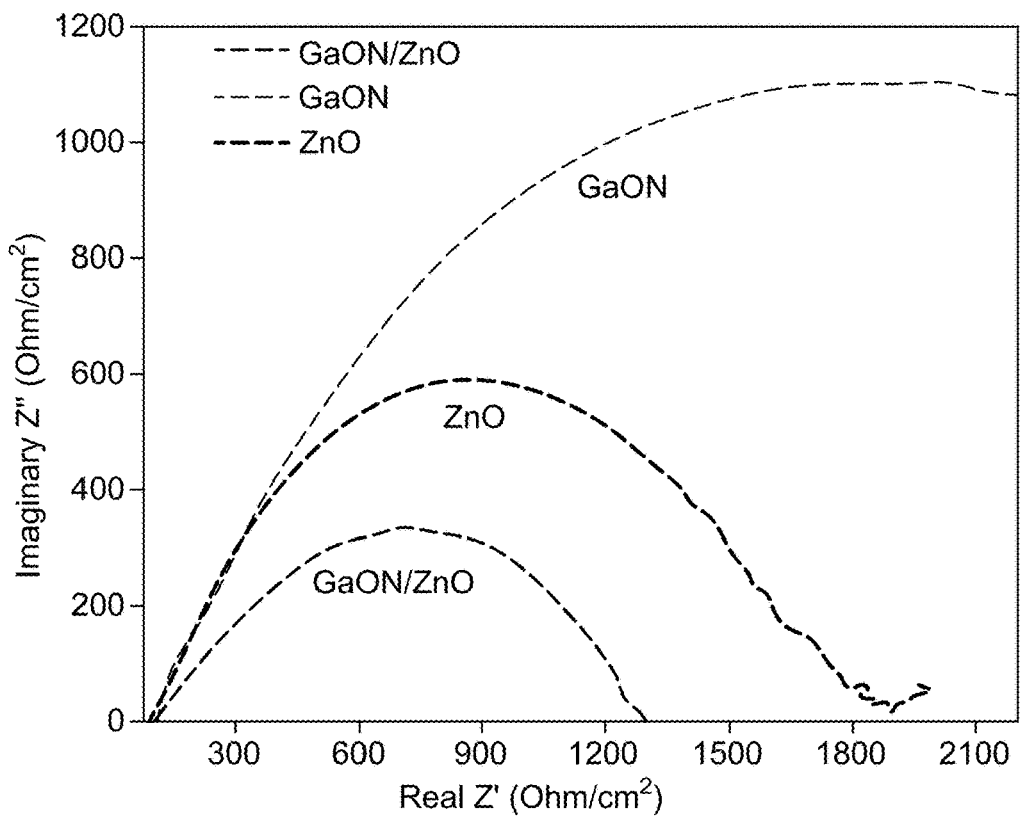
FIG. 9D is an overlay of Nyquist plots of ZnO nanorods, GaON nanosheets, and GaON/ZnO nanoarchitecture deposited over FTO substrate.
Figure 10:
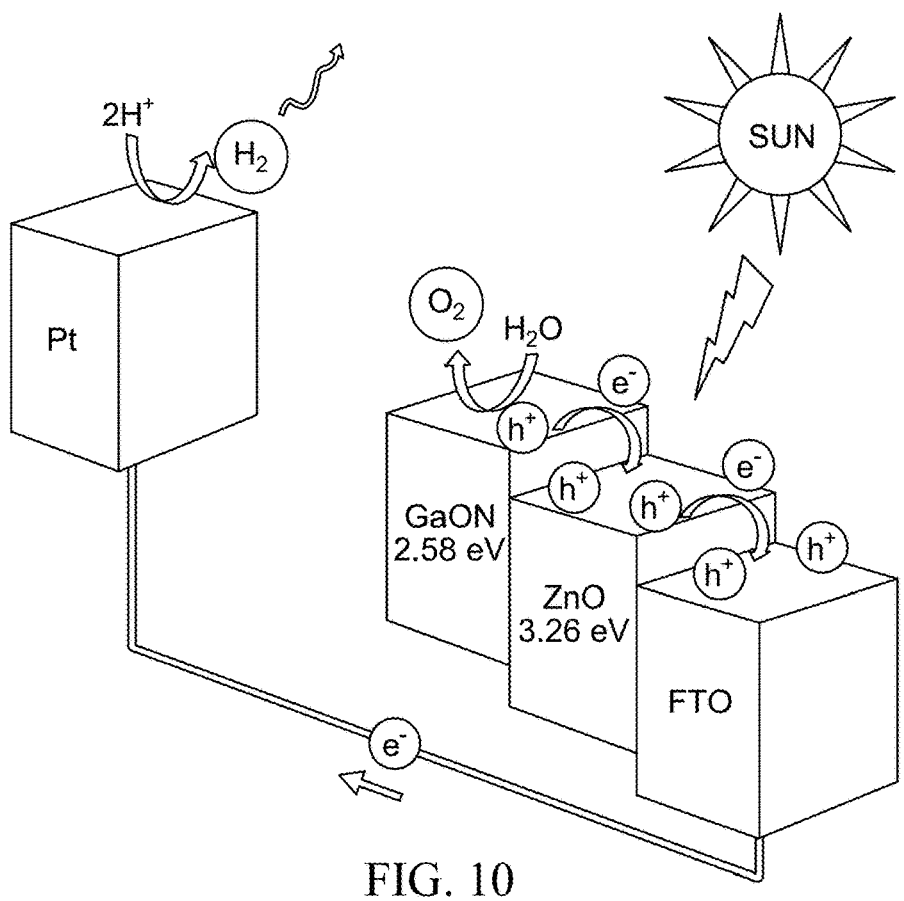
FIG. 10 shows the photoelectrochemical (PEC) water splitting mechanism over GaON/ZnO photoelectrode.

The Nyquist plot (FIG. 9D) was recorded to examine the charge transfer resistance for ZnO, GaON and GaON/ZnO at the interface. All materials showed the characteristic semicircular resistance curve, indicating that they all are feasible for charge transfer [Y.-H. Lai, C.-Y. Lin, H.-W. Chen, J.-G. Chen, C.-W. Kung, R. Villal, K.-C. Ho, Fabrication of a ZnO film with a mosaic structure for a high efficient dye-sensitized solar cell, J. Mater. Chem. 20 (2010) 9379; and M. Zirak, M. Zhao, O. Moradlou, M. Samadi, N. Sarikhani, Q. Wang, H.-L. Zhang, A. Z. Moshfegh, Controlled engineering of WS$_2$ nanosheets-CdS nanoparticle heterojunction with enhanced photoelectrochemical activity, Sol. Energy Mater. Sol. Cells 141 (2015) 260-269, each incorporated herein by reference in their entirety]. The radii of the semicircular curves, which represent the electron transfer at the boundary of the electrode and deposited layers, decreased in the order of ZnO NRs>GaON nanosheets>GaON/ZnO nanoarchitecture. Based on the EIS Nyquist plots, it is clear that a faster interfacial charge transfer is possible in case of GaON/ZnO, and thus it showed much enhanced photoactive behavior than pristine ZnO nanorods and GaON nanosheets as revealed by LSV and chronoamperometry. Table 1 provided a comparison between synthetic methods and photocurrent densities obtained from PEC water splitting using various Gallium (Ga) based photocatalysts. It can be concluded that pristine gallium oxide ($Ga_2O_3$), gallium nitride (GaN) and gallium oxynitride (GaON) showed relatively lower current densities as compared to their nanocomposites. Similarly, $BiVO_4/GaO_xN_{1-x}$, which was synthesized by a sol-gel spin coating technique, also showed a lower photocurrent density of 0.37 $mA/cm^2$ at 1.23 V. The ZnO based GaN/ZnO showed a significant photocurrent density of 0.9-1.2 $mA/cm^2$. Nevertheless, the nitridation was performed by thermal treatment of GaN/ZnO NPs under a harsh $NH_3$ environment, over a relatively expensive $TiO_2$ substrate.

nism in GaON/ZnO nanoarchitecture (FIG. 10). An earlier study indicated the valence band (VB) of ZnO lie well below the ideal OER conduction level of water splitting and therefore showed less significant water splitting [A. G. Tamirat, J. Rick, A. A. Dubale, W.-N. Su, B.-J. Hwang, Using hematite for photoelectrochemical water splitting: a review of current progress and challenges, Nanoscale Horiz. 1 (2016) 243-267, incorporated herein by reference in its entirety]. On the other hand, GaON is a good photoactive material for HER [N. Iqbal, I. Khan, Z. H. Yamani, A. Qurashi, Sonochemical assisted solvothermal synthesis of gallium oxynitride nanosheets and their solar-driven photoelectrochemical water-splitting applications, Sci. Rep. 6 (2016) 32319, incorporated herein by reference in its entirety]. It was assumed that due to GaON/ZnO formation, these energy bands reorient to a certain extent, which lead to an increase in the water splitting efficiency. During this contact, the band structure of GaON/ZnO reconfigures, as the band bending takes place from GaON to ZnO and drifting of electron starts from the former towards later. In addition to band bending, the valence band of ZnO shifts upward, due to intermixing of their orbitals with GaON nanosheets in the GaON/ZnO nano architectures. The shifting of energy levels continues until the Fermi levels achieve

TABLE 1

Comparative photoelectrochemical water splitting performance of Gallium based photocatalysts in terms of photocurrent density

| Materials | Synthesis method | Electrolytes | Applied voltage (V) | Photocurrent density (I) | Ref. |
|---|---|---|---|---|---|
| 1. $\beta$-$Ga_2O_3$ NPs | RF Sputtering | 1M NaCl | 0.2 V vs Ag/AgCl | 0.002 $mA/cm^2$ | I |
| 2. Flat porous GaN | Thermal Ammonia Treatment | 0.5M $Na_2SO_4$ | 1.23 V vs Ag/AgCl | 0.20 $mA/cm^2$ | II |
| 3. GaON nanosheets | Hydrothermal Method | 0.5M $Na_2SO_4$ | 0.60 V vs SCE | 0.28 $mA/cm^2$ | III |
| 4. $BiVO_4/GaO_xN_{1-x}$ | Sol-Gel Spin Coating | 0.5M $K_3PO_4$ | 1.23 V vs Ag/AgCl | 0.37 $mA/cm^2$ | IV |
| 5. GaN/ZnO NPs | Thermal Ammonia Treatment | 0.5M $K_3PO_4$ | 1.23 V vs SCE | 0.9-1.2 $mA/cm^2$ | V |
| 6. GaON/ZnO NTAs | Chemical Mixing | 0.5M $Na_2SO_4$ | 1.23 V vs SCE | 1.2 $mA/cm^2$ | This work |

[Ref. I: S.-J. Chang, Y.-L. Wu, W.-Y. Weng, Y.-H. Lin, W.-K. Hsieh, J.-K. Sheu, C.-L. Hsu, Ga2O3 films for photoelectrochemical hydrogen generation, J. Electrochem. Soc. 161 (2014) H508-H511; Ref. II: H. J. Kim, J. Park, B. U. Ye, C. J. Yoo, J.-L. Lee, S.-W. Ryu, H. Lee, K. J. Choi, J. M. Baik, Parallel aligned mesopore arrays in pyramidal-shaped gallium nitride and their photocatalytic applications, ACS Appl. Mater. Interfaces 8 (2016) 18201-18207; Ref. III: N. Iqbal, I. Khan, Z. H. Yamani, A. Qurashi, Sonochemical assisted solvothermal synthesis of gallium oxynitride nanosheets and their solar-driven photoelectrochemical water-splitting applications, Sci. Rep. 6 (2016) 32319; Ref. IV: B. K. Kang, G. S. Han, J. H. Baek, D. G. Lee, Y. H. Song, S. Bin Kwon, I. S. Cho, H. S. Jung, D. H. Yoon, Nanodome structured $BiVO_4/GaO_xN_{1-x}$ photoanode for solar water oxidation, Adv. Mater. Interfaces 4 (2017) 1700323; and Ref. V: Z. Wang, J. Han, Z. Li, M. Li, H. Wang, X. Zong, C. Li, Moisture-assisted preparation of compact GaN:ZnO photoanode toward efficient photoelectrochemical water oxidation, Adv. Energy Mater. 6 (2016) 1600864, each incorporated herein by reference in their entirety.]

The obtained PEC water splitting results can be helpful to propose possible water splitting and charge transfer mechaa new equilibrium. Upon photon irradiation from the solar simulator, photo-excitons are generated in the valance and conduction band. The negative electrons ($e^-$) leave behind positive holes ($h^+$) in the valence band and jump to the conduction band. These electrons drift from GaON bending sites to ZnO surface from where it transfers to counter electrode through an external circuit. These electrons are readily available for reduction reaction to generate hydrogen from water. On the other hand, the holes ($h^+$) in the VB bands of GaON migrate to the VB of ZnO in a similar fashion and consume the water molecules for OER. As indicated by the Nyquist plot in FIG. 9D, these photogenerated exciton pairs ($h^+$ and $e^-$) are effectively separated from each other and therefore, contribute to the PEC water splitting reaction. The PL spectrum also supports this phenomenon, as it shows dramatic quenching, which can be correlated with the enhancement of lifetime of photogenerated charges. Thus, GaON extensively enhances the overall water splitting performance of ZnO by shifting the bands to desirable values, providing photogenerated excitons, and offering certain stability due to their intercalation and strong anti-photocorrosive nature.

EXAMPLE 9

Theoretical Calculations

For theoretical water splitting calculations, spinel structure (Imm2, no. 44) of gallium oxynitride ($Ga_3O_3N$) with lattice parameters a, b=5.8534 Å and c=8.2780 Å was considered [T. D. Boyko, C. E. Zvoriste, I. Kinski, R. Riedel, S. Hering, H. Huppertz, A. Moewes, Anion ordering in spinel-type gallium oxonitride, Phys. Rev. B 84 (2011) 85203, incorporated herein by reference in its entirety]. Only atomic positions were relaxed during the structural optimization. After optimization, a slab geometry with O-rich (111) surface orientation was created, which was found to be the lowest energy surface in the experiments. This slab geometry was further optimized by fixing some of the atoms at the bottom layer (see FIG. 1B).

To understand water adsorption on the considered systems, a single water molecule was introduced in the vacuum region at a distance of 5 Å above the surface. Structural optimizations were conducted for 8 different initial locations of the water molecule using LBFGS optimizer method [D. C. Liu, J. Nocedal, On the limited memory BFGS method for large scale optimization, Math. Program 45 (1989) 503-528, incorporated herein by reference in its entirety]. Some atoms at the bottom of the slab were kept fixed during the simulations. The adsorption occurred through the formation of Ga—O or Zn—O bonds.

Figure 11A:
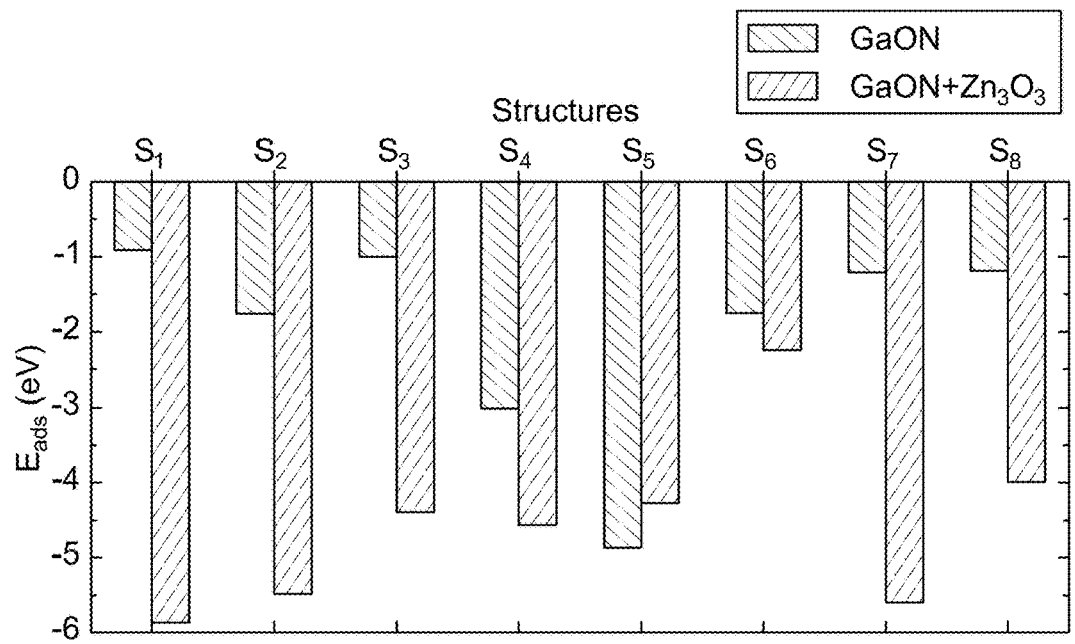
FIG. 11A is a bar graph showing adsorption energies of water molecule on O-rich (111) surface of GaON and on GaON/ZnO hetero-structure.
Figure 11B:
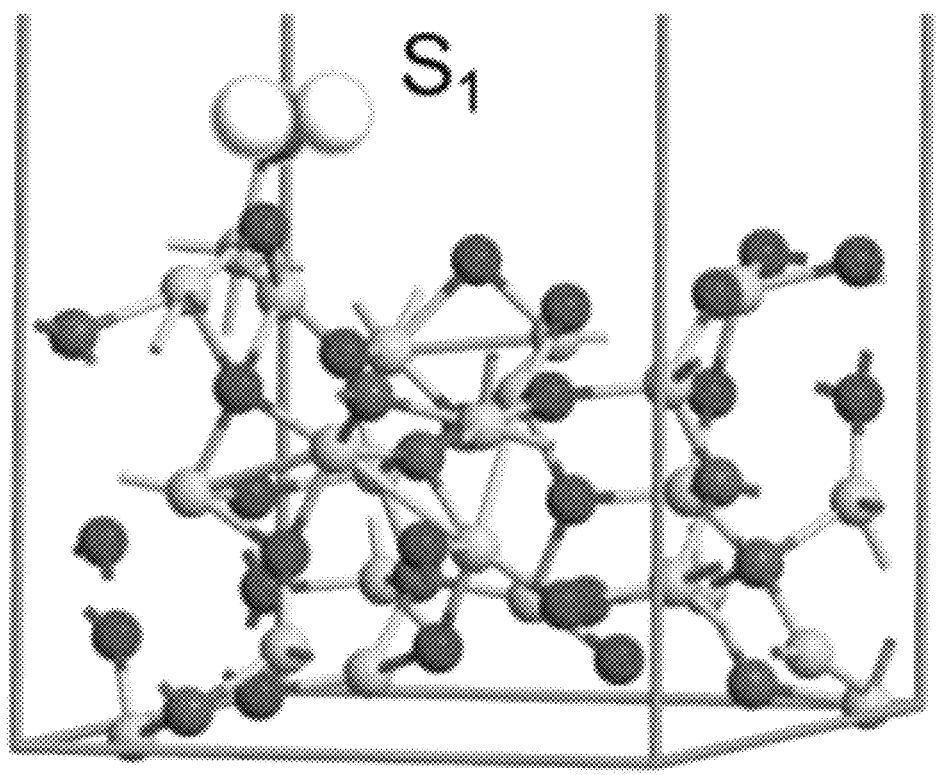
FIG. 11B shows an optimized structure of water molecules (larger balls) on the surface of GaON.
Figure 11C:
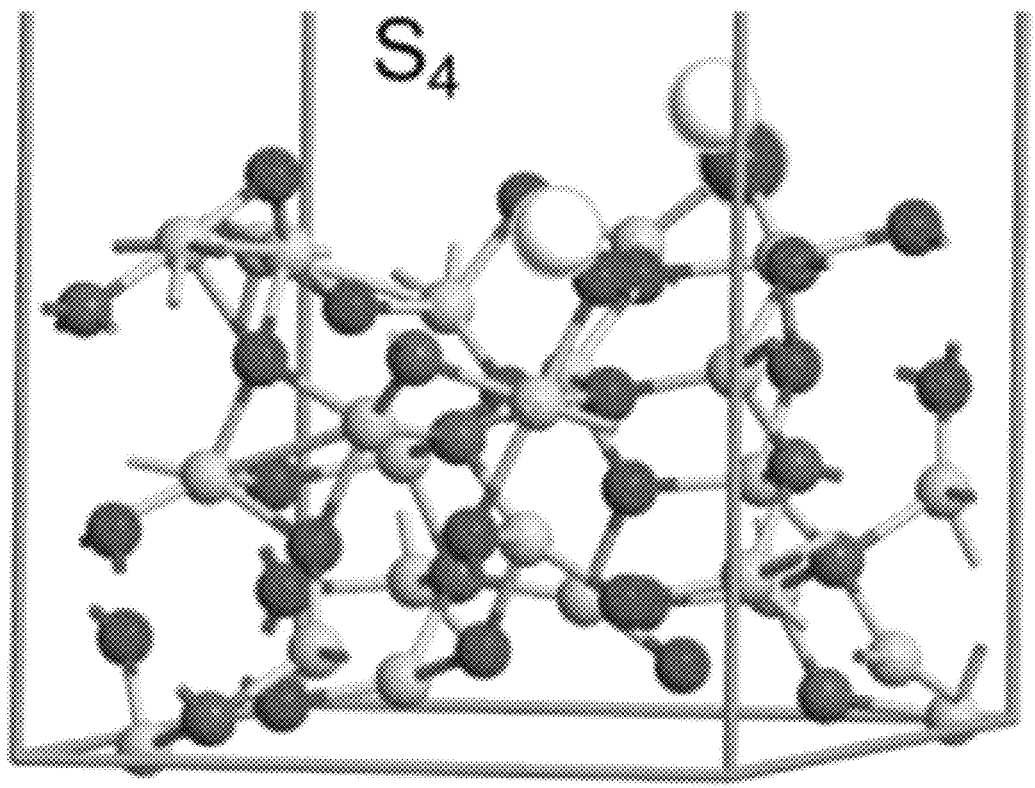
FIG. 11C shows another optimized structure of water molecules (larger balls) on the surface of GaON.
Figure 11D:
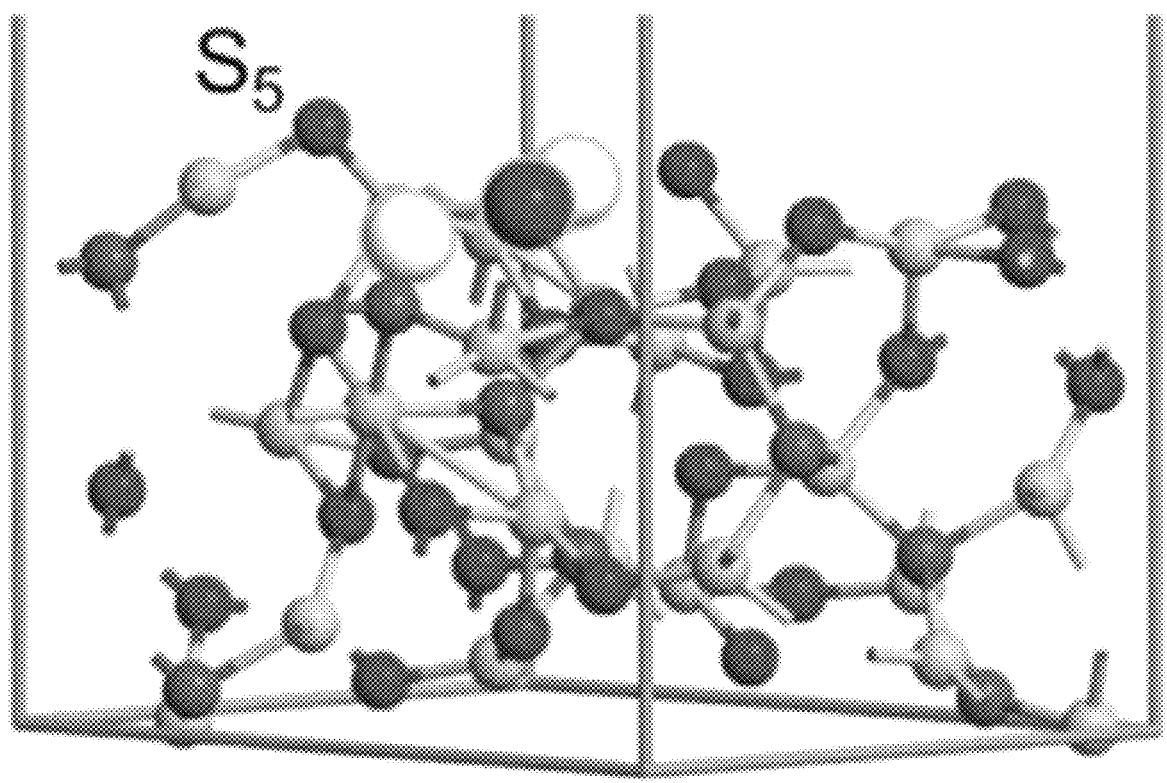
FIG. 11D shows another optimized structure of water molecules (larger balls) on the surface of GaON.
Figure 11E:
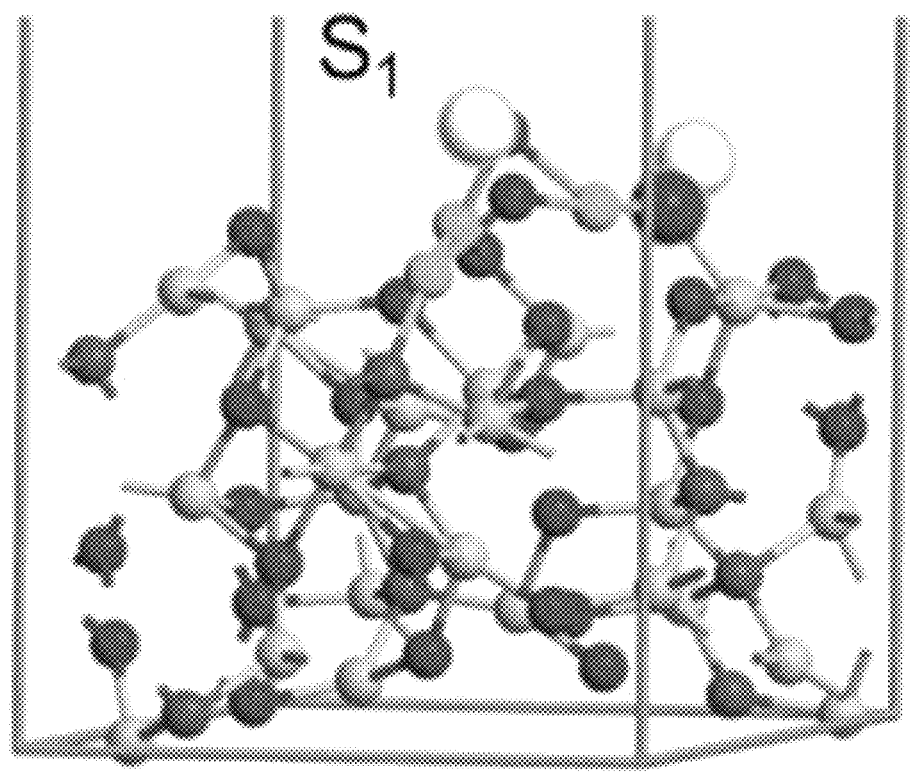
FIG. 11E shows an optimized structure of water molecules (larger balls) on the surface of GaON/ZnO.
Figure 11F:
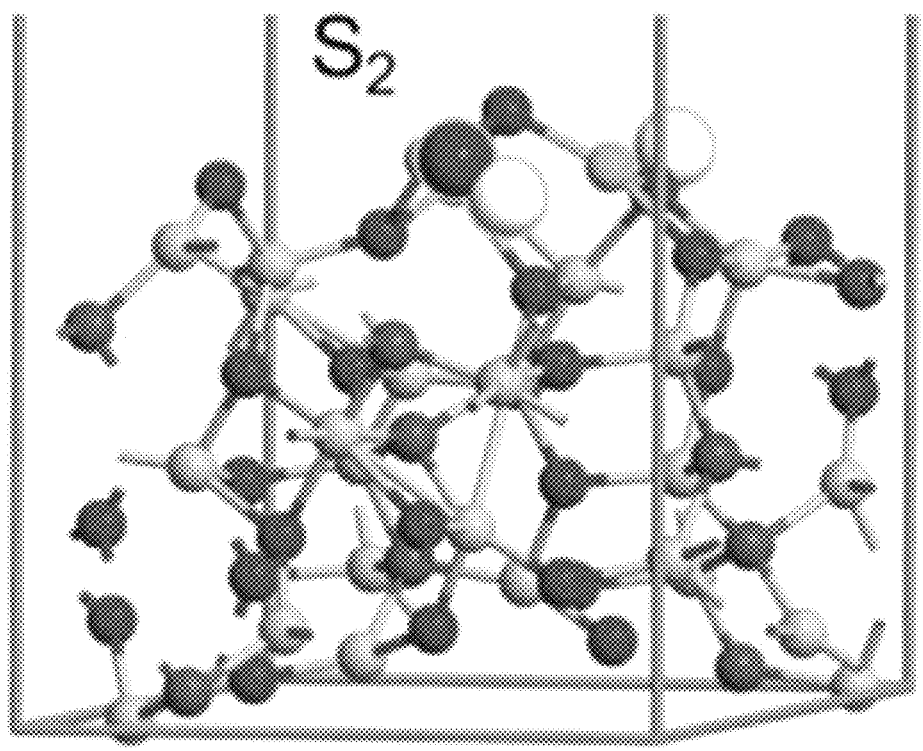
FIG. 11F shows another optimized structure of water molecules (larger balls) on the surface of GaON/ZnO.
Figure 11G:
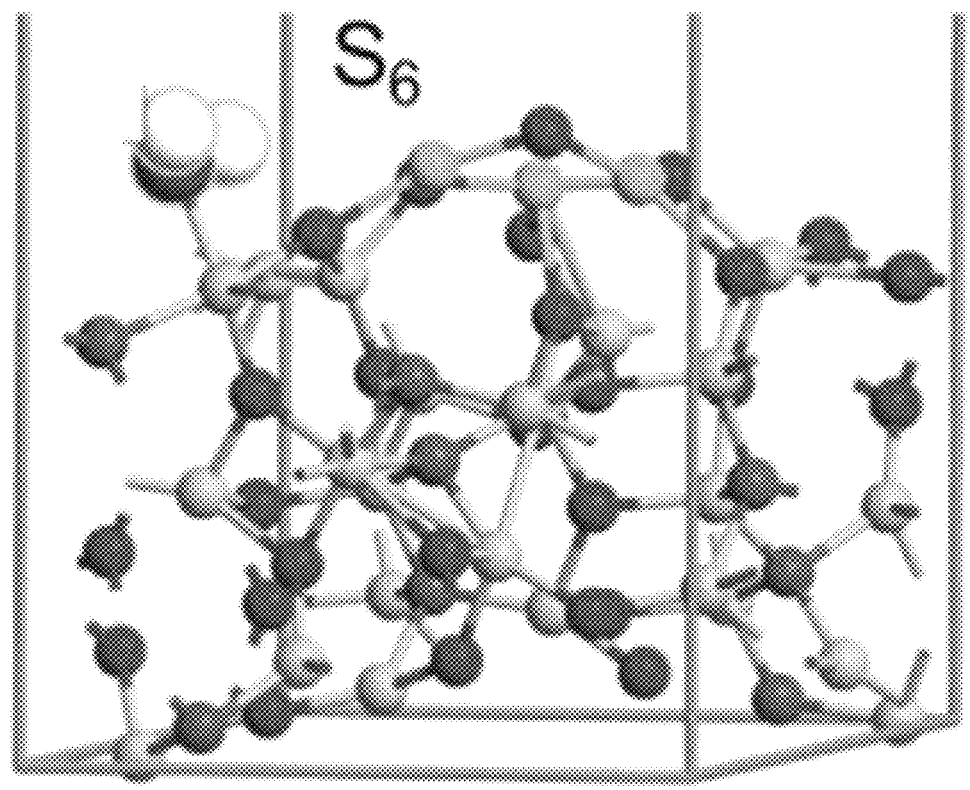
FIG. 11G shows another optimized structure of water molecules (larger balls) on the surface of GaON/ZnO.

Black columns in FIG. 11A show the adsorption energies $E_{ads}$ of the water molecule on the (111) surface of GaON. The water molecule is chemisorbed with adsorption energy less than 2 eV with the formation of the Ga—O bond (see FIG. 11B). Dissociation of the water molecule during the structural optimization was also achieved (FIGS. 11C and 11D), which gives the adsorption energies of more than 4 eV. One hydrogen atom of the water molecule was transferred to neighboring O or N atoms. Interestingly, the water molecule dissociateed into one hydroxyl and one hydrogen in the GaON+$Zn_3O_3$ nanoarchitecture system whenever the water molecule was adsorbed on the $Zn_3O_3$ cluster (see FIGS. 11E and 11F). Consequently, the adsorption energies become more than 4 eV (see GaON+$Zn_3O_3$ columns in FIG. 11A). Molecular adsorption was found in this system only when the water molecule interacted with the Ga atoms (FIG. 11G). Thus, $Zn_3O_3$ cluster plays an essential role as a catalytic center for the water splitting process.

EXAMPLE 10

The GaON/ZnO photoelectrode has demonstrated an improved PEC water splitting performance. Unlike high-temperature ammonia treatment, which requires complex safety measures, the incorporation of nitrogen for the fabrication of GaON was carried out at a mild temperature [K. Maeda, T. Takata, M. Hara, N. Saito, Y. Inoue, H. Kobayashi, K. Domen, GaN:ZnO solid solution as a photocatalyst for visible-light-driven overall water splitting, J. Am. Chem. Soc. 127 (2005) 8286-8287, incorporated herein by reference in its entirety]. Composite materials with heterogeneous systems provide additional reaction sites, thus accelerating photo-catalytic reactions [X. Zong, H. Yan, G. Wu, G. Ma, F. Wen, L. Wang, C. Li, Enhancement of photocatalytic $H_2$ evolution on CdS by loading $MoS_2$ as cocatalyst under visible light irradiation, J. Am. Chem. Soc. 130 (2008) 7176-7177, incorporated herein by reference in its entirety]. Such composite materials usually have complex structures, which are difficult to be identified experimentally. First-principles density functional theory (DFT) calculations are recognized as an expedient tool to study the structural, physical and chemical properties of nanoarchitecture systems and obtain a fundamental understanding of the mechanism of photocatalytic reactions [M. Setvin, U. Aschauer, P. Scheiber, Y.-F. Li, W. Hou, M. Schmid, A. Selloni, U. Diebold, Reaction of $O_2$ with subsurface oxygen vacancies on $TiO_2$ anatase (101), Science 341 (2013), incorporated herein by reference in its entirety]. To complement our experimental results on GaON/ZnO architecture, DFT calculations were also conducted on a model system having $Zn_3O_3$ clusters loaded on (111) surface of GaON (see FIG. 1). It was found that the $Zn_3O_3$ model provides efficient reaction sites and enhances the dissociative adsorption energy of water molecules. The DFT results confirm the experimental performance of GaON/ZnO photoelectrode in the PEC water splitting process.

GaON/ZnO nanoarchitecture photoelectrode was successfully developed by the hydrothermal method over FTO in a single-step process. The morphological study through FE-SEM indicated GaON nanosheets interpenetrated in ZnO nanorods framework. EDX, mapping, and XPS confirmed elemental details and presence of nitrogen in the overall nanoarchitecture. XRD and Raman spectra showed slight right shift due to replacement of Zinc by denser Gallium atoms in the crystal due to the formation of GaON/ZnO nanoarchitecture. The optical study via DRS and PL confirmed the decrease in the bandgap from ZnO (3.26 eV) to GaON/ZnO nanoarchitecture (2.58 eV), as well as significant quenching of GaON/ZnO nanoarchitecture, which might be attributed to visible light absorption and decrease in the photogenerated exciton recombination rate, respectively. The photoelectrochemical results indicated that the current density was increased by up to 2.4 folds in the GaON/ZnO nanoarchitecture at 1.0 V bias and a maximum current density of 1.2 $mA/cm^2$ was achieved at 1.2 V. The Nyquist plot showed the decrease in the resistance of GaON/ZnO, which can be correlated with enhancement of charge transfer through the interface. DFT and MD calculations on water adsorption on GaON and GaON+$Zn_3O_3$ nanoarchitecture surfaces indicated that the catalytic performance of the system increased significantly due to the presence of the $Zn_3O_3$ cluster. Our simulation findings are in agreement with the experimental results. It is important to note that this approach can be potentially extended to develop other multi-component cost effective photoactive materials for exceptionally efficient and stable solar-driven water splitting applications.

The invention claimed is:
1. A GaON/ZnO photoelectrode, comprising:
 a metal oxide conducting substrate; and
 a nanoarchitectured photocatalytic material deposited onto a surface of the metal oxide conducting substrate;
 wherein the nanoarchitectured photocatalytic material comprises:
  zinc oxide nanoparticles; and
  gallium oxynitride nanoparticles interspersed in the zinc oxide nanoparticles;
 wherein the zinc oxide nanoparticles form a framework;
 wherein the gallium oxynitride nanoparticles are interpenetrated in the framework; and
 the gallium oxynitride nanoparticles are uniformly distributed in the framework.
2. The GaON/ZnO photoelectrode of claim 1, wherein the zinc oxide nanoparticles are in the form of nanorods.
3. The GaON/ZnO photoelectrode of claim 1, wherein the gallium oxynitride nanoparticles are in the form of nanosheets.

4. The GaON/ZnO photoelectrode of claim 2, wherein the nanorods have an average diameter of 20-100 nm and an average length of 500-2,000 nm.

5. The GaON/ZnO photoelectrode of claim 3, wherein the nanosheets have an average thickness of 5-50 nm and an average length of 200-1,500 nm.

6. The GaON/ZnO photoelectrode of claim 1, wherein a weight ratio of the zinc oxide nanoparticles to the gallium oxynitride nanoparticles is in a range of 4:1 to 100:1.

7. The GaON/ZnO photoelectrode of claim 1, wherein the metal oxide conducting substrate is fluorine doped tin oxide substrate.

8. The GaON/ZnO photoelectrode of claim 1, which has an ultraviolet visible absorption with an absorption edge of 410-520 nm.

9. The GaON/ZnO photoelectrode of claim 1, which has a band gap energy of 2.2-2.7 eV.

10. A photoelectrochemical cell, comprising:
the GaON/ZnO photoelectrode of claim 1;
a counter electrode; and
an electrolyte solution comprising water and an inorganic salt in contact with both the GaON/ZnO photoelectrode and the counter electrode.

11. The photoelectrochemical cell of claim 10, wherein the electrolyte solution has an inorganic salt concentration of 0.05-1 M.

12. The photoelectrochemical cell of claim 10, wherein the GaON/ZnO photoelectrode has a photo-current density in a range from 0.01-1.5 mA/cm$^2$ when the photoelectrochemical cell is subjected to a potential of 0.1 to 1.5 V under visible light irradiation.

13. The photoelectrochemical cell of claim 10, further comprising a reference electrode.

14. A method of splitting water into hydrogen gas and oxygen gas, the method comprising:
subjecting the photoelectrochemical cell of claim 10 to a potential of 0.5 to 2.0 V; and
concurrently irradiating the photoelectrochemical cell with visible light, thereby forming hydrogen gas and oxygen gas.

15. A method of producing the GaON/ZnO photoelectrode of claim 1, the method comprising:
mixing the zinc oxide nanoparticles and the gallium oxynitride nanoparticles in a solvent to form a mixture;
sonicating the mixture to form a dispersed mixture;
depositing the dispersed mixture onto a surface of the metal oxide conducting substrate to form a deposited substrate; and
heating the deposited substrate at a temperature of 70-150° C. for 0.5-4 hours.

16. The method of claim 15, wherein a weight ratio of the zinc oxide nanoparticles to the gallium oxynitride nanoparticles is in a range of 4:1 to 100:1.

17. The method of claim 15, wherein the solvent is water.

18. The method of claim 15, wherein the depositing is performed at a temperature of 50-120° C.

19. The method of claim 15, wherein the depositing is performed at a pressure of 100-300 kPa.

20. The method of claim 15, wherein the heating is followed by cooling to a temperature ranging from 5-40° C. thereby forming the GaON/ZnO photoelectrode.

* * * * *